United States Patent
Kurihara et al.

(10) Patent No.: US 6,325,845 B1
(45) Date of Patent: Dec. 4, 2001

(54) AQUEOUS INK FOR BALL POINT PENS

(75) Inventors: Norimasa Kurihara; Hiroshi Inoue, both of Osaka (JP)

(73) Assignee: Sakura Color Products Corporation, Osaka-fu (JP)

( * ) Notice: Subject to any disclaimer, the term of this patent is extended or adjusted under 35 U.S.C. 154(b) by 0 days.

(21) Appl. No.: 09/484,556

(22) Filed: Jan. 18, 2000

(30) Foreign Application Priority Data

Nov. 5, 1999 (JP) .................................................. 11-315563

(51) Int. Cl.⁷ .................................................. C09D 11/00
(52) U.S. Cl. .................................... 106/31.68; 106/31.69; 106/31.86; 106/31.65; 106/31.7
(58) Field of Search .............................. 106/31.68, 31.69, 106/31.86, 31.65, 31.7

(56) References Cited

U.S. PATENT DOCUMENTS

| | | | |
|---|---|---|---|
| 5,466,283 | 11/1995 | Kondo et al. | 106/31.36 |
| 5,474,603 | * 12/1995 | Miyashita et al. | 106/31.33 |
| 6,083,311 | * 7/2000 | Kanbayashi et al. | 106/31.65 |
| 6,099,629 | * 8/2000 | Morita et al. | 106/31.6 |
| 6,120,590 | * 9/2000 | Miyamoto et al. | 106/31.6 |

FOREIGN PATENT DOCUMENTS

| | | |
|---|---|---|
| 59-74175 | 4/1984 | (JP) . |
| 2-279777 | 11/1990 | (JP) . |
| 4-214782 | 8/1992 | (JP) . |
| 6-088050 | 3/1994 | (JP) . |
| 7-216283 | 8/1995 | (JP) . |
| 8-151547 | 6/1996 | (JP) . |
| 9-151355 | 6/1997 | (JP) . |
| 10-279875 | 10/1998 | (JP) . |
| 11-029734 | 2/1999 | (JP) . |
| 11-080629 | 3/1999 | (JP) . |
| 11-130998 | 5/1999 | (JP) . |
| 11-302587 | 11/1999 | (JP) . |

* cited by examiner

Primary Examiner—Helene Klemanski
Assistant Examiner—Veronica F. Faison
(74) Attorney, Agent, or Firm—Merchant & Gould P.C.

(57) ABSTRACT

The present invention relates to an aqueous ink for ball point pens comprising a coloring pigment, a water-soluble organic solvent, water and a polysaccharide, wherein pigment particles of said coloring pigment gather and form a spotted agglomerate phase. The present invention also relates to an aqueous ink with a coloring pigment and a metallic powder pigment comprising a water-soluble organic solvent, water and a polysaccharide, wherein pigment particles of both the coloring pigment and the metallic powder pigment gather to the same pigment phase and form a complex agglomerate phase.

18 Claims, 30 Drawing Sheets

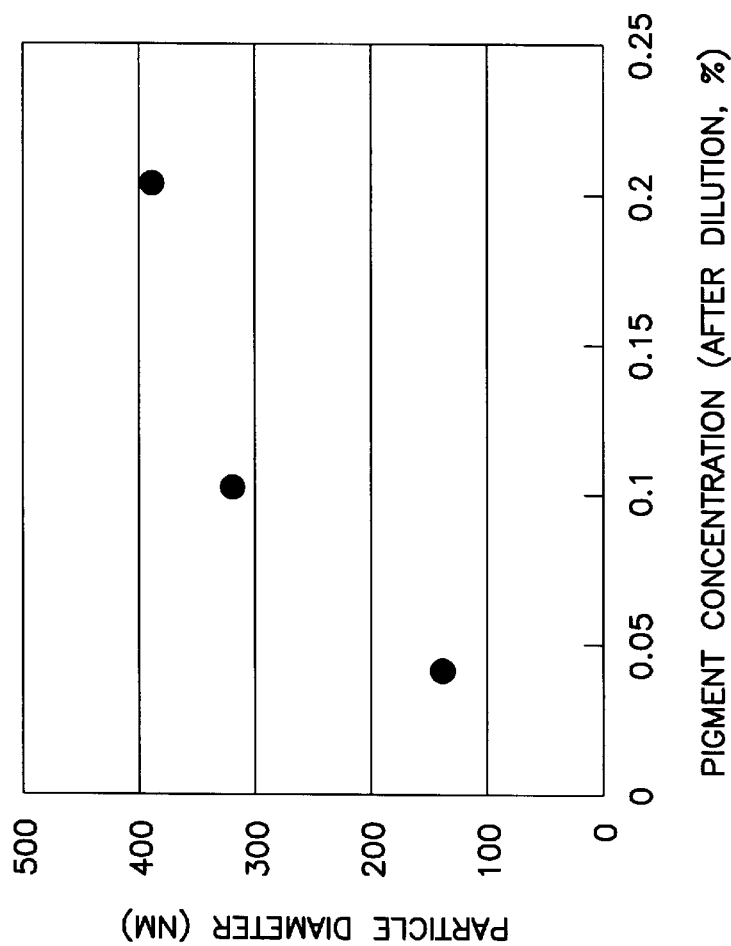
FIG.30 ● LIGHT TRANSMISSION METHOD BASED ON THE LIQUID SEDIMENTATION

AQUEOUS INK FOR BALL POINT PENS

FIELD OF THE INVENTION

The present invention relates to an aqueous ink for ball point pens and more particularly to an aqueous ink for ball point pens that prevents a separation of pigment particles in a high viscosity liquid of polysaccharide for a long period.

PRIOR ART

Conventionally, various aqueous ink compositions for ball point pens comprising a colorant, a polysaccharide and water are disclosed (Japan Unexamined Patent Publication No.59-74175, No.2-279777, No.4-214782, No.6-88050, No.8-151547, No.11-29734, No.11-80629, No.11-130998). These aqueous ink compositions maintain their high viscosity at rest, however once applied to writing, they exhibit low viscosity and a good writing characteristic thanks to a shear force generated by the rotation of a ball.

However, these conventional aqueous inks do not have sufficient stability for a long-term storage. Specifically, when used for a long time, an aqueous ink for ball point pens containing a coloring pigment as a coloring agent often separates to in a low viscosity component including coloring pigment and the other high viscosity component inside an ink container. As a result, when a ball point pen containing such an ink is allowed to stand with its pen tip oriented downward, the low viscosity components precipitate to the pen tip and leak from the pen tip. When such a ball point pen is applied to writing, a writing characteristic deteriorates because of an excess ink flow and the writing portion dries too slowly. Further, the low viscosity components include an excess amount of the coloring pigment and hence, the writing portion will exhibit an excess change in its tint and will have a concentrated dark color.

It generally has been considered that the above-mentioned inconvenience is caused by the coagulation of pigment particles whose uniform dispersion is destroyed. For example, Japan Unexamined Patent Publication No.6-8805 tried to improve stability in long-term storage of an ink composition by adding succinoglucan as a polysaccharide in order to prevent the coagulation of the pigment particles (the enlargement of the particle diameter) and maintain the uniform dispersion of pigment particles. However, such an ink, actually, separation of the low viscosity components including an excess amount of the coloring pigment tends to occur inside of an ink container and further segregation of color causes different shades in a writing portion as mentioned above. In an extreme case, when the pen is used for a long period, a concentrated pigment solution flows out from a pen tip.

Particularly, with an aqueous ink composition for ball point pens comprising a polysaccharide such as rhamzan gum, weran gum, xanthan gum and succinoglucan, a water-soluble organic solvent and water, and further including an aluminum powder pigment together with a coloring pigment as a coloring agent, the coloring pigment tends to separate even from the metallic powder pigment with time, besides the above-mentioned separation. Then, it develops to the segregation of color. In an extreme case, when the pen is used for a long time, the high viscosity components including an aluminum powder pigment and the low viscosity component including a coloring pigment could develop to an upper liquid layer and a lower liquid layer respectively. With these separations, the precipitation of the coloring pigment is visible even when the pen is laid for on its side storage and the outward appearance deteriorates remarkably. When the ink with such separation which has been stored with its pen tip oriented downward for a long time, is applied to writing, an expected metallic tone cannot be obtained in its writing potion because the concentrated coloring pigment solution without aluminum metallic powder pigment flows out from the pen tip at first.

Accordingly, one of the objects of the present invention is to provide an aqueous ink for ball point pens with excellent stability against long-term storage which prevents separation of the coloring pigment, restrains segregation providing the writing portion of uniform color without any different shades and prevents leakage or excess flow of the ink.

Another object of the present invention is to provide an aqueous ink for ball point pens with excellent stability to long-term storage, which prevents separation of the coloring pigment from the other components and the metallic powder pigment even after being used for a long period and restrains segregation so that its writing portion has a metallic tone and uniform color without any different shades and further prevents leakage or excess flow of the ink.

SUMMARY OF THE INVENTION

As a result of intensive study to achieve the above-mentioned objects, the present inventor found that an aqueous ink comprising a coloring pigment, a water-soluble organic solvent, water and a polysaccharide, in which pigment particles of said coloring pigment gather to form a spotted agglomerate phase, does not cause separation between the bulk phase of the coloring pigment and the other components.

The present invention relates to an aqueous ink for ball point pens comprising a coloring pigment, a water-soluble organic solvent, water and a polysaccharide wherein pigment particles of a coloring pigment gather and form a spotted agglomerate phase.

Accordingly, even after being used for a long time, the separated liquid of the concentrated coloring pigments does not appear in the ink remaining inside of an ink container of a ball point pen.

When an ink is prepared by mixing a phase containing a conventional coloring pigment dispersed beforehand together with a vehicle phase containing a solution of a polysaccharide (the phase other than that containing the coloring pigment), both phases seem to be mixed uniformly just after the preparation. However, the phase containing the coloring pigment is not compatible with the polysaccharide and both phases would separate with time.

In the present invention, the agglomerate phase of the coloring pigment is formed beforehand and that makes a contact area between the phase containing the coloring pigment (hereinafter, called a pigment phase) and the vehicle phase (the phase containing components other than coloring pigment) smaller. Therefore their compatibility is improved and the separation between the both phases can be prevented.

Further, the inventor found that an aqueous ink for ball point pens comprising a coloring pigment, a metallic powder pigment, a water-soluble organic solvent, water and a polysaccharide, wherein pigment particles of both said coloring pigment and said metallic powder pigment gather to the same pigment phase and form a complex agglomerate phase, different shade of color or disappearance of color in a writing portion can be prevented.

That is, a further embodiment of the present invention is an aqueous ink for ball point pens comprising a coloring pigment, a metallic powder pigment, a water-soluble organic solvent, water and a polysaccharide wherein pigment particles of both said coloring pigment and said metallic powder pigment gather to the same pigment phase to form the spotted complex agglomerate phase. With such an ink, the liquid separation between the coloring pigment and the metallic powder pigment does not occur even after the ball point pen is used for a long time. Further, pigment particles of both the coloring pigment and the metallic powder pigment gather to the same pigment phase and form the complex agglomerate phase as mentioned above, and the metallic writing portion with the color of the coloring pigment can be obtained.

The preferable binding medium for the gathering of the pigment particles that forms the mentioned agglomerate phase or complex agglomerate phase is a water-soluble polymer. The agglomerate phase or the complex agglomerate phase of the pigment particles in the present invention indicates an agglomeration wherein the pigment particles gather with the effect of the i.e. water-soluble polymer as a binding medium between the particles, and not a coagulation wherein the pigment particles coagulate directly.

In addition, "spotted" means the state of being scattered and dotted. It also may include the state wherein those spotted pigment phases are partially connected. That is, "spotted" in the present invention is exemplified by the state of the pigment phase shown in FIG. 1 to FIG. 16 wherein the discontinuous pigment phases are scattered and dotted, and it is distinguished from the state shown in FIG. 17 to FIG. 28 wherein a continuous belt-shaped stream is formed.

BRIEF DESCRIPTION OF THE DRAWINGS

FIG. 30 is a graphical representation of the relationship between the concentration of pigment dispersant (%) and particle diameter of the pigment shown in Table 6.

Figure 1:
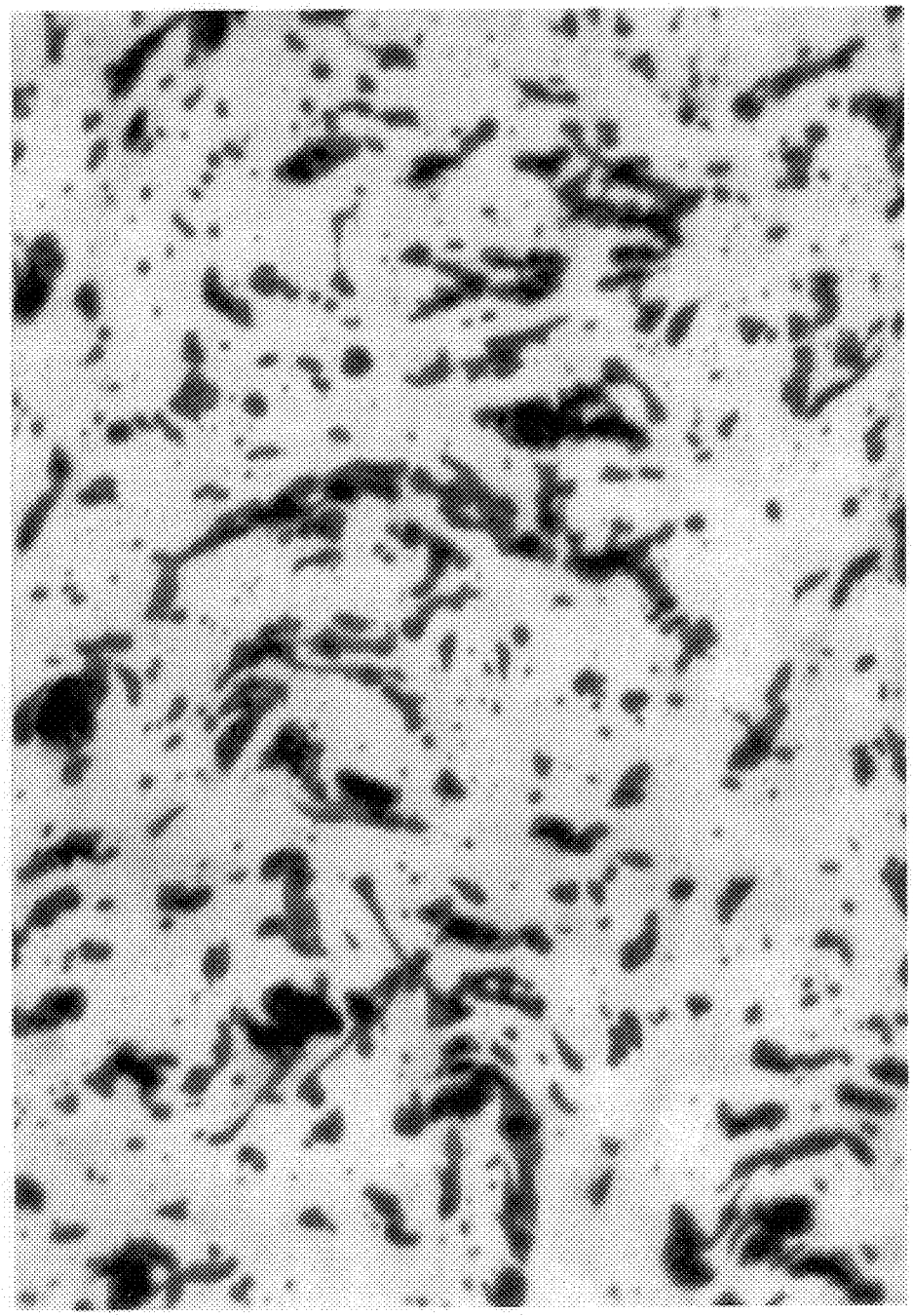
FIG. 1 is a micrograph (X200) showing the state of the ink prepared in Example 1, which is taken with a polarizing microscope.

DETAILED DESCRIPTION OF THE PREFERABLE EMBODIMENTS (Coloring Pigment)

The coloring pigment to be used in the present invention is not particularly limited. For example, inorganic pigments, organic pigments and fluorescent pigments are applicable. More concretely, examples of the coloring pigment include an inorganic pigment such as carbon black and titanium oxide, an organic pigment such as copper-phtalocyanine series, threne-series, azo-series, quinacridone-series, anthroaquinoid-series, dioxazine-series, indigoid-series, thioindigoid-series, per inone-series, perylene-series, indolinone-series, azomethine-series, and a fluorescent pigment. These pigments can be used also as a pigment dispersion. Further, dyes (such as direct dyes, acid dyes and basic dyes) and plastic pigments colored by pigment or dye may be used.

The coloring pigment may be used either alone or as a mixture. The amount of the coloring pigment to be used is from 0.05% by weight to 15% by weight and preferably, from 1% by weight to 10% by weight relative to the total amount of the ink composition. When the content of the coloring pigment is less than 0.05% by weight relative to the total amount of the ink composition, the color development lowers. On the other hand, when the content of coloring pigment exceeds 15% by weight, the writing =characteristic deteriorates because of the increase of the solid content.

(Metallic Powder Pigment)

Both leafing type and non-leafing type metallic powder pigment are applicable to the present invention. For example, a brass powder pigment or an aluminum powder pigment is applicable; and particularly the aluminum powder pigment is preferable to be used. A metallic powder pigment may be used as a metallic powder pigment dispersion.

Examples of the aluminum powder pigment include such as "ALPASTE WJP-U75C" (trade name of a product from Toyo Aluminum Inc.), "ALPASTE WE1200" (trade name of a product from Toyo Aluminum Inc.) "ALPASTE WXM7675" (trade name of a product from Toyo Aluminum Inc.) "ALPASTE WXMO630" (trade name of a product from Toyo Aluminum Inc.) "1110W" (available from Showa Aluminum Inc.) "2172SW" (available from Showa Aluminum Inc.) "AW-808C" (available from Asahi Kasei Inc.) and "AW-7000R" (available from Asahi Kasei Inc.).

Examples of the brass powder pigment include such as "BS-605" (trade name of a product from Toyo Aluminum Inc.), "BS-607" (trade name of a product from Toyo Aluminum Inc.), "BRONZE POWDER P-555" (trade name of a product from Nakajima Metallic Powder Co.,Ltd) and "BRONZE POWDER P-777" (trade name of a product from Nakajima Metallic Powder Co.,Ltd).

The average particle diameter of the metallic powder pigment (the brass powder pigment and the aluminum powder pigment) is from 5 $\mu$m to 15 $\mu$m, preferably. When the average particle diameter of the metallic powder pigment (the brass powder pigment and the aluminum powder pigment) falls within this range, the writing characteristic is excellent.

The metallic powder pigment (the brass powder pigment and the aluminum powder pigment) may be used either alone or as a mixture. The amount of the metallic powder pigment (the brass powder pigment and the aluminum powder pigment) to be used is from 1% by weight to 30% by weight, and preferably, from 2% by weight to 6% by weight relative to the total amount of the ink composition. If the content of the metallic powder pigment, particularly that of the aluminum powder pigment is less than 1% by weight relative to the total amount of the ink composition, metallic luster is not exhibited sufficiently. On the other hand, if the content of the metallic powder pigment, particularly that of the aluminum powder pigment is greater than 30% by weight relative to the total amount of the ink composition, the writing characteristic deteriorates because of the increase of the solid content.

(Polysaccharide)

The polysaccharide to be used in the present invention is not particularly limited as long as the polysaccharide can adjust the viscosity of the ink. The preferable polysaccharide is one that can provide the ink with the thixotropiec characteristic. Examples of the polysaccharide include a microbial polysaccharide or derivatives thereof, a water-soluble vegetable polysaccharide or derivatives thereof, a water-soluble animal polysaccharide or derivatives thereof.

Examples of the microbial polysaccharide or derivatives thereof include pullulan, xanthan gum, weran gum, rhamzan gum, succinoglucan, and dextran.

Examples of the water-soluble vegetable polysaccharide or derivatives thereof include tragacanth gum, guar gum, tara gum, locust bean gum, gade gum, arabinogalactan gum, gum arabic, quince seed gum, pectin, starch, sayrumseed gum, carrageenan, alginic acid and agar. Examples of the water-soluble animal polysaccharide or the derivatives thereof include for example, gelatin and casein.

Preferable natural polysaccharides include the microbial polysaccharides or derivatives thereof, particularly xanthan gum, weran gum, rhamzan gum or succinoglucan.

The polysaccharide may be used either alone or as a mixture. The content of the polysaccharide is, for example, from 0.1% by weight to 2% by weight, and preferably, from 0.15% by weight to 0.5% by weight, relative to the total amount of the ink composition.

(Water-Soluble Polymer)

It is important in the present invention that the water-soluble polymer helps the pigment particles to gather and form the spotted agglomerate phase in the ink comprising a water-soluble organic solvent, water and a polysaccharide. Further, in case that the metallic powder pigment, specifically the aluminum powder pigment is used together with the above-mentioned coloring pigment, the water-soluble polymer of the invention should enable both pigments to gather to the same pigment phase and form the complex agglomerate phase which is spotted. Examples of the water-soluble polymer meeting the above-mentioned requirements include a polyethylene glycol and cellulose derivatives. Particularly, the polyethylene glycol is the most preferable because its molecular weight is high.

The number-average molecular weight of the water-soluble polymer meeting these requirements is preferably from 7,000 to 1,100,000. Specifically, the number average molecular weight of the polyethylene glycol is preferably 8,000 to 1,100,000. Examples of the polyethylene glycol include those commercially available from Sumitomo Seika Chemicals Company, Limited under the trade name of "PEO-1" (number-average molecular weight: 150,000 to 400,000), "PEO-3" (number-average molecular weight: 600,000 to 1,100,000) and the like.

Examples of suitable cellulose derivatives to be used include carboxymethyl cellulose or salts thereof, methyl cellulose, hydroxyethyl cellulose, hydroxypropyl cellulose, hydroxypropylmethyl cellulose and hydroxypropylethyl cellulose. The number-average molecular weight of these cellulose derivatives is preferably 7,000 to 400,000. The amount of these water-soluble polymer to be used is from 00.1% by weight to 10% by weight, preferably from 0.2% by weight to 4% by weight relative to the total amount of the ink composition. When the content of the water-soluble polymer is less than 0.1% by weight relative to the total amount of the ink composition, the amount of the water-soluble polymer is not enough and the pigment particles of the coloring pigment have difficulty in gathering and forming the agglomerate phase in the ink comprising a water-soluble organic solvent, water and a polysaccharide.

Particularly with the ink comprising a water-soluble organic solvent, water and a polysaccharide, wherein the metallic powder pigment such as the aluminum powder pigment is contained together with the coloring pigment, a phase separation tends to occur with time between the coloring pigment and the metallic powder pigment. As a result, segregation appears and the writing portion will be without metallic tone. On the other hand, when the content of the above-mentioned water-soluble polymer is greater then 10% by weight relative to the total amount of the ink composition, the writing characteristic deteriorates because of the increase of viscosity of the ink.

(Water-Soluble Organic Solvent)

The water-soluble organic solvent to be used in the invention is not particularly limited as long as the water-soluble organic solvent can be miscible with water and prevent the freezing at low temperature or the drying up of the ink. Examples of preferable water-soluble organic solvents include alcohol, glycol (for example, ethylene glycol, diethylene glycol, propylene glycol and the like), glycol ethers (for example, ethylene glycol monomethyl ether, and the like), carbitols (for example, diethylene glycol monomethyl ether and the like), glycerin, and trimethylolpropane. The water-soluble organic solvent may be used either alone or as a mixture.

The amount of the water-soluble organic solvent to be used is not specifically limited. For example, the amount is from 1% by weight to 40% by weight, and preferably, from 5% by weight to 20% by weight relative to the total amount of the ink composition. If the content of the water-soluble organic solvent is less than 1% by weight relative to the total amount of the ink composition, the ink dries easily at the pen tip so that clogging occurs and at worse, writing becomes impossible. On the other hand, if the content is greater than 40% by weight, it takes a long time to dry the ink after writing.

(Water)

The commonly used water (for example, ion exchange water, distilled water, and the like) can be used in the present invention. The amount of water to be used is not particularly limited and may vary depending on the target viscosity of the ink and kind or amount of the other ingredients. The amount of water to be used varies in large range, for example from 1% by weight to 80% by weight, and preferably, from 20% by weight to 70% by weight relative to the total amount of the ink composition.

The viscosity of the present ink composition is not particularly limited as long as the composition maintains the suitable viscosity for writing while preventing the aluminum powder pigment or the coloring pigment from precipitation. In the present invention, the viscosity is, for example, preferably within the range between 1,500 cps and 10,000 cps at 20° C. In addition, the viscosity is measured by the viscometer of ELD type, and under the condition that the cone: 3°R14 cone, the rotation speed: 0.5 rpm, the temperature: 20° C.

To the present aqueous metallic ink, conventional additives may be added as required: for example, a corrosion prevention (a benzotriazole, a tolyltriazole, a dicyclohexylammonium nitrite and the like), an antiseptic-fungicide agent (a benzisothiazoline antiseptic-fungicide agent, a pentachlorophenol antiseptic-fungicide agent, a cresol antiseptic-fungicide agent and the like), a surfactant, a moisturizer, an anti-foam agent, a leveling agent, a pH modifier, a pseudo-plasticity formation agent, and the like.

(Method for Preparation)

The method for preparation of the present ink is not particularly limited. For example, the present ink, wherein the pigment particles gather and form the spotted agglomerate phase, is obtained by introducing the water-soluble polymer into the dispersion of the coloring pigment dispersed in the water and the water-soluble organic solvent, and then adding there to the polysaccharide and the other additives as required. When case the metallic powder pigment is used, the dispersion of the coloring pigment and the metallic powder pigment dispersed in the water and the water-soluble organic pigment should be prepared beforehand. Then the water-soluble polymer is introduced thereto and the polysaccharide and the other additives as required are added and mixed together to obtain an ink. In addition, methods for dispersion, deaeration, and filtration in the preparation of the ink may be selected from known methods.

EXAMPLES

A blue pigment dispersion and a red pigment dispersion were prepared respectively with the following components.

| (blue pigment dispersion) | |
|---|---|
| Phtalocyaninblue (Available from Dainippon Ink and Chemicals, Inc. under the trade name of "FIRSTGENBLUE BSW") | 25% by weight |
| styrene-acrylic resin (Available from Johnson Polymer Inc. under the trade name of "JOHNCRYL 697") | 5% by weight |
| propylene glycol | 5% by weight |
| sodium hydroxide | 0.06% by weight |
| ion-exchange water | the rest |

The above-mentioned components were dispersed by bead mill. The resultant mixture was diluted with ion-exchange water to make the content of the pigment be 15% by weight to obtain a blue pigment dispersion whose average particle diameter is 0.10 µm.

| (red pigment dispersion) | |
|---|---|
| naphthol azo red (Available from Dainippon Ink and Chemicals, Inc. under the trade name of "SHIMURAFIRSTRED 4127") | 25% by weight |
| styrene-acrylic resin (Available from Johnson Polymer Inc. under the trade name of "JOHNCRYL 697") | 5% by weight |
| propylene glycol | 5% by weight |
| sodium hydroxide | 0.06% by weight |
| ion-exchange water | the rest |

The above-mentioned components were dispersed by bead mill. The resultant mixture was diluted with ion-exchange water to make the content of the pigment be 15% by weight to obtain a red pigment dispersion whose average particle diameter was 0.15 µm.

Examples 1 to 8

The components shown in the Table 1 (% by weight) were mixed in the above-mentioned manner to prepare each ink.

TABLE 1

| | EXAMPLES [% by weight] | | | | | | | |
|---|---|---|---|---|---|---|---|---|
| | 1 | 2 | 3 | 4 | 5 | 6 | 7 | 8 |
| Ion-exchange water | 19.5 | 34.5 | 29.5 | 19.5 | 14.5 | 29.5 | 24.5 | 14.5 |
| Blue pigment dispersion | 35 | 20 | — | — | 35 | 20 | — | — |
| Red pigment dispersion | — | — | 25 | 30 | — | — | 25 | 30 |
| Aluminum powder pigment | — | — | — | — | 5 | 5 | 5 | 5 |
| polyethyleneglycol (10% water solution) | 10 | — | — | 20 | 10 | — | — | 20 |
| Hydroxypropyl celullose (10% water solution) | — | 10 | — | — | — | 10 | — | — |
| Carboxymethyl cellulose (10% water solution) | — | — | 15 | — | — | — | 15 | — |
| Succinoglucan (1% water solution) | 35 | — | 30 | — | 35 | — | 30 | — |
| Rhamzan gum (1% water solution) | — | 35 | — | — | — | 35 | — | — |
| Weran gum (1% water solution) | — | — | — | 30 | — | — | — | 30 |
| Antiseptic—fungicide agent | 0.5 | 0.5 | 0.5 | 0.5 | 0.5 | 0.5 | 0.5 | 0.5 |

Notes)
Aluminum powder pigment: trade name "ALPASTE WXM0630" available from Toyo Aluminum Inc.
Polyethyleneglycol: trade name "PEO-1" available from Sumitomo Seika Chemicals Company, Limited. (10% water solution)
Hydroxypropyl cellulose: trade name "HPC-SL" available from Nippon Soda Co., Ltd. (10% water solution)
Carboxymethyl cellulose: trade name "SELOGEN 6A" available from Dai-ichi Kogyo Seiyaku Co., Ltd. (10% water solution)
Succinoglucan: trade name "REOXAN" available from Sansho Co,. Ltd. (1% water solution)
Rhamzan gum: Trade name "K7C233" available from Sansho Co,. Ltd. (1% water solution)
Weran gum: Trade name "K1C376" available from Sansho Co,. Ltd. (1% water solution)
antiseptic-fungicide agent (1,2-benzoisothiazoline-3-on): Trade name "PROXEL XL2" available from ZENECA Co,. Ltd.

Comparative Example

The ink compositions of comparative examples 1 to 6 were prepared with the components shown in the following Table 2 in the same manner as in the above-mentioned Examples except adding polyethyleneglycol, hydroxypropyl cellulose and carboxymethyl cellulose.

TABLE 2

| | COMPARATIVE EXAMPLE [% by weight] | | | | | |
|---|---|---|---|---|---|---|
| | 1 | 2 | 3 | 4 | 5 | 6 |
| Ion-exchange water | 34.5 | 44.5 | 34.5 | 29.5 | 39.5 | 29.5 |
| Blue pigment dispersion | 35 | 25 | — | 35 | 25 | — |
| Red pigment dispersion | — | — | 30 | — | — | 30 |
| Aluminum powder pigment | — | — | — | 5 | 5 | 5 |
| Succinoglucan (1% water solution) | 30 | — | — | 30 | — | — |
| Rhamzan gum (1% water solution) | — | 30 | — | — | 30 | — |
| Weran gum (1% water solution) | — | — | 35 | — | — | 35 |
| Antiseptic-fungicide agent | 0.5 | 0.5 | 0.5 | 0.5 | 0.5 | 0.5 |

(Evaluation)

The ink of each of the Examples and Comparative Examples was filled in an ink container tube for ball point pens including of a polypropylene hollow shaft that had a ball point pen tip made of German silver (the material of ball: hard metal, the diameter of ball: 0.8 mmφ) connected at its edge. Then, air bubbles of the ink were removed by centrifuging to obtain test samples of ball point pens.

Figure 2:
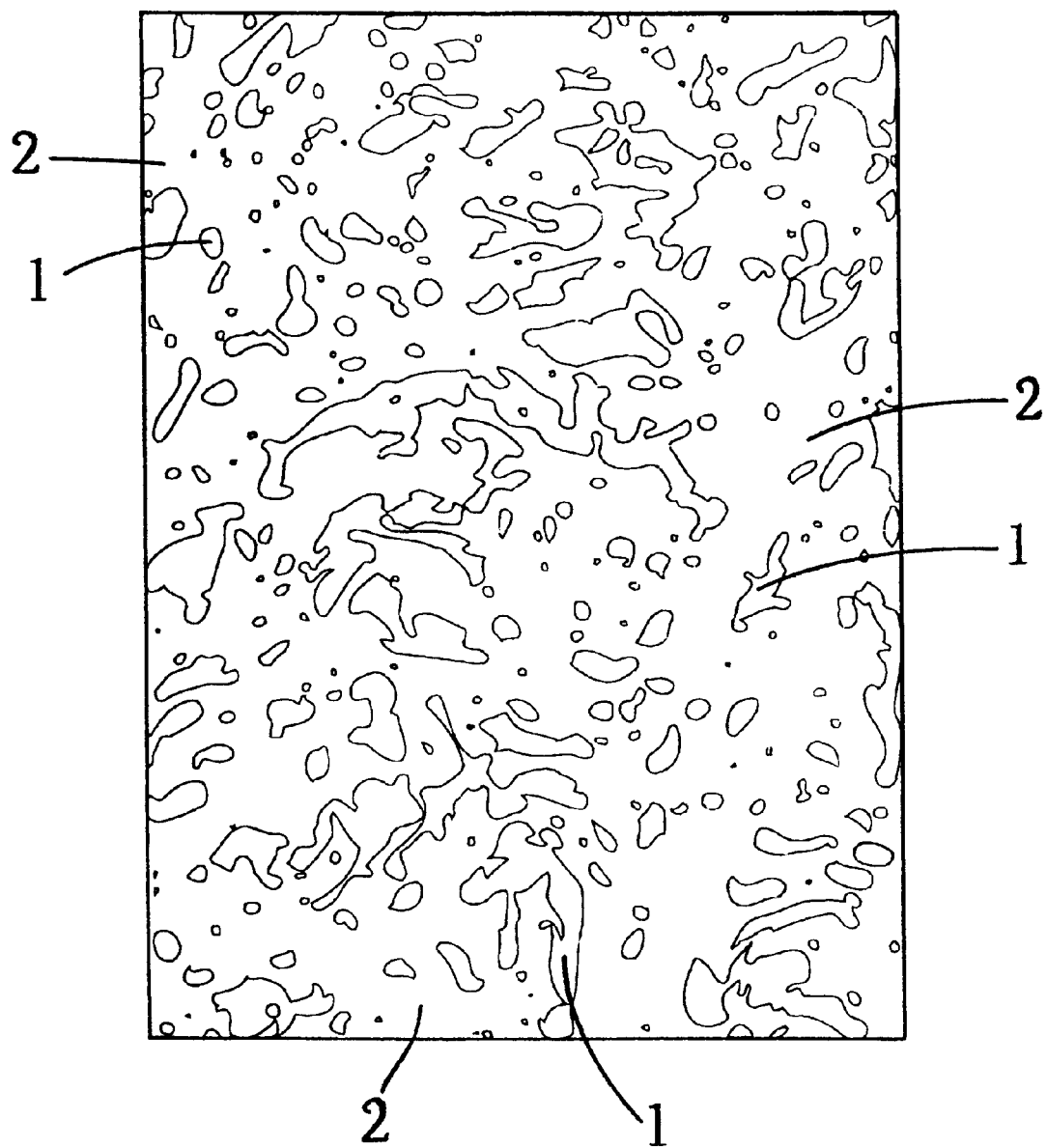
FIG. 2 is a schematic illustration based on FIG. 1, showing the state of the ink.
Figure 3:
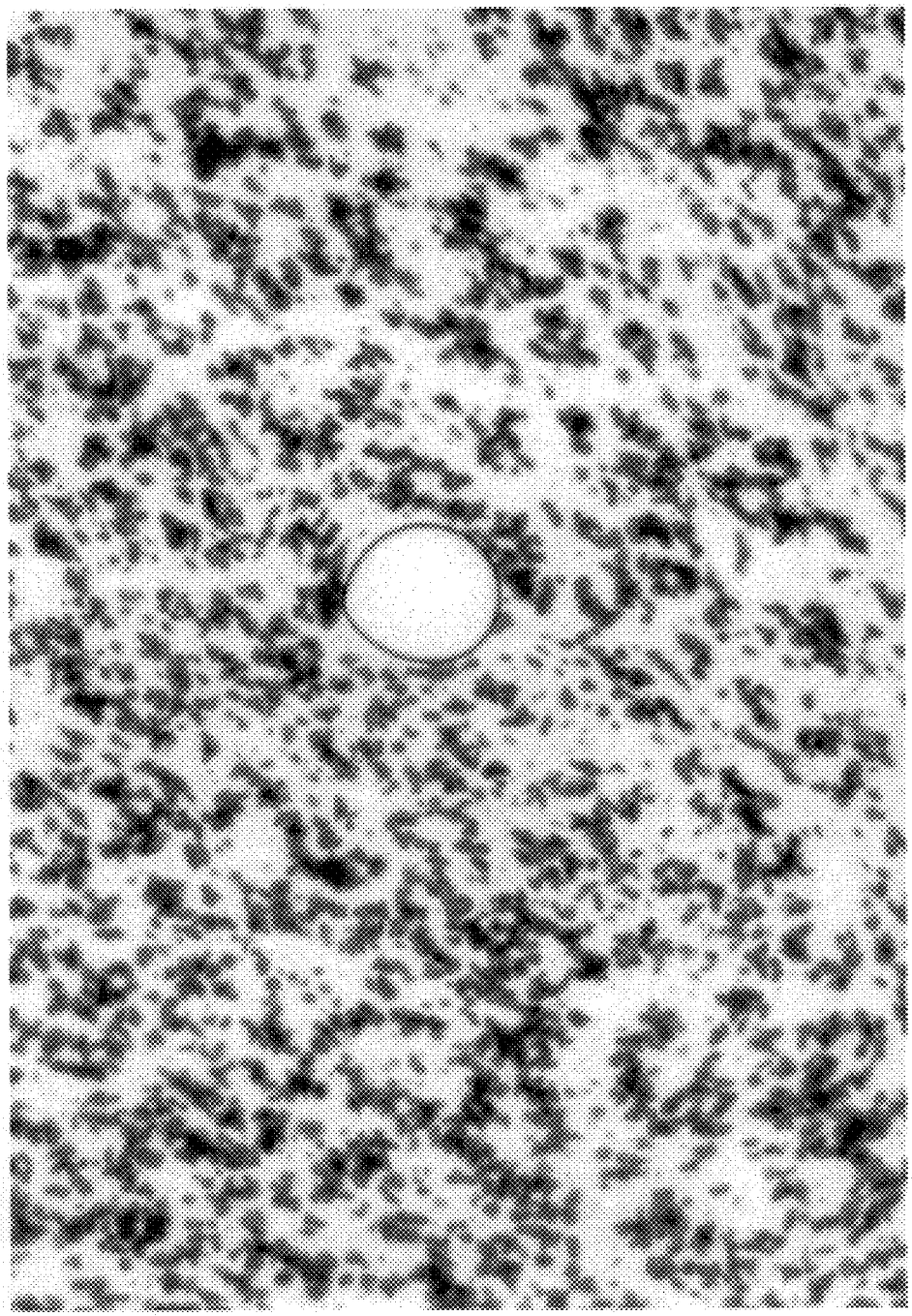
FIG. 3 is a micrograph (X200) showing the state of the ink prepared in Example 2, which is taken with a polarizing microscope.
Figure 4:
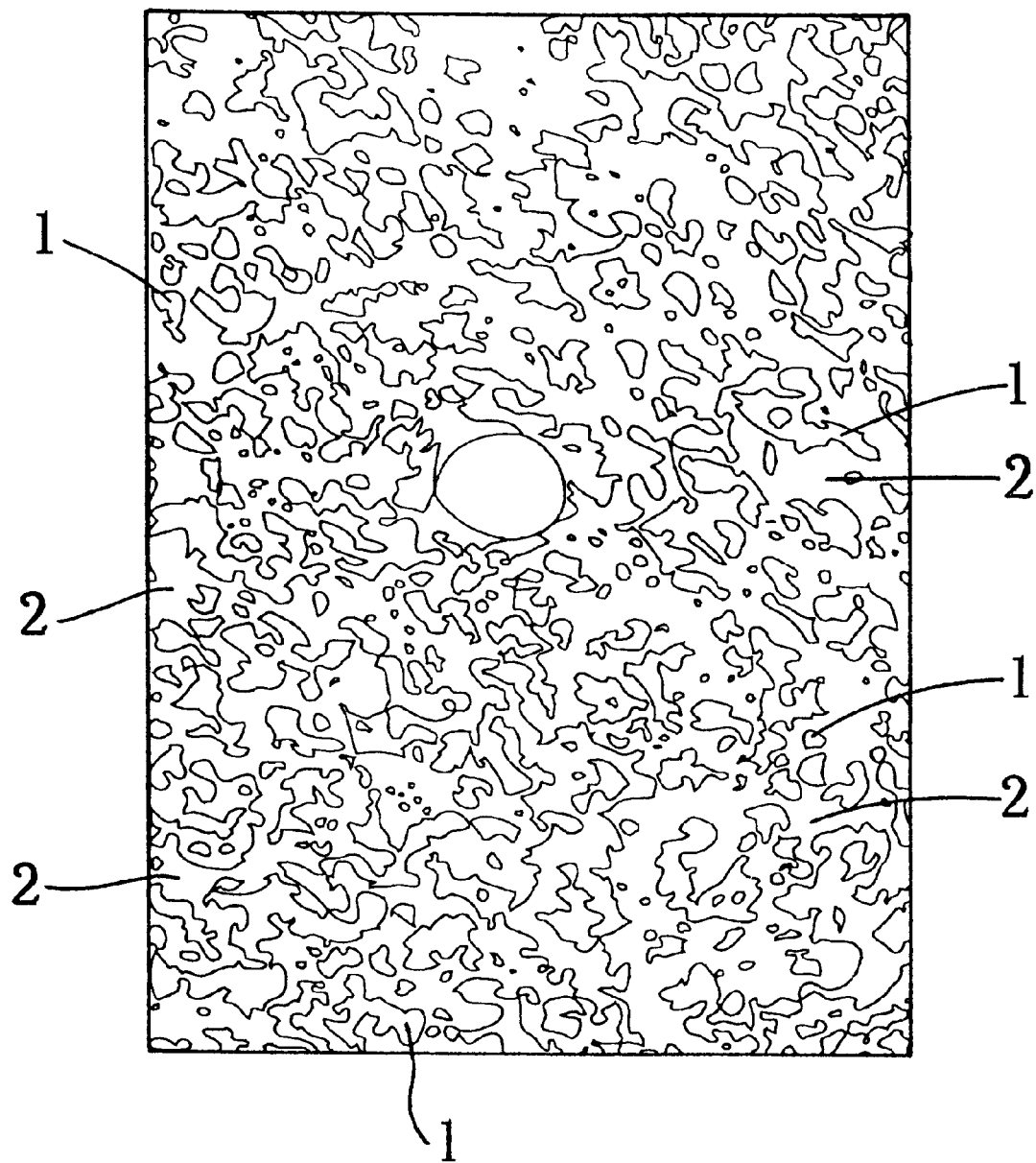
FIG. 4 is a schematic illustration based on FIG. 3, showing the state of the ink.
Figure 5:
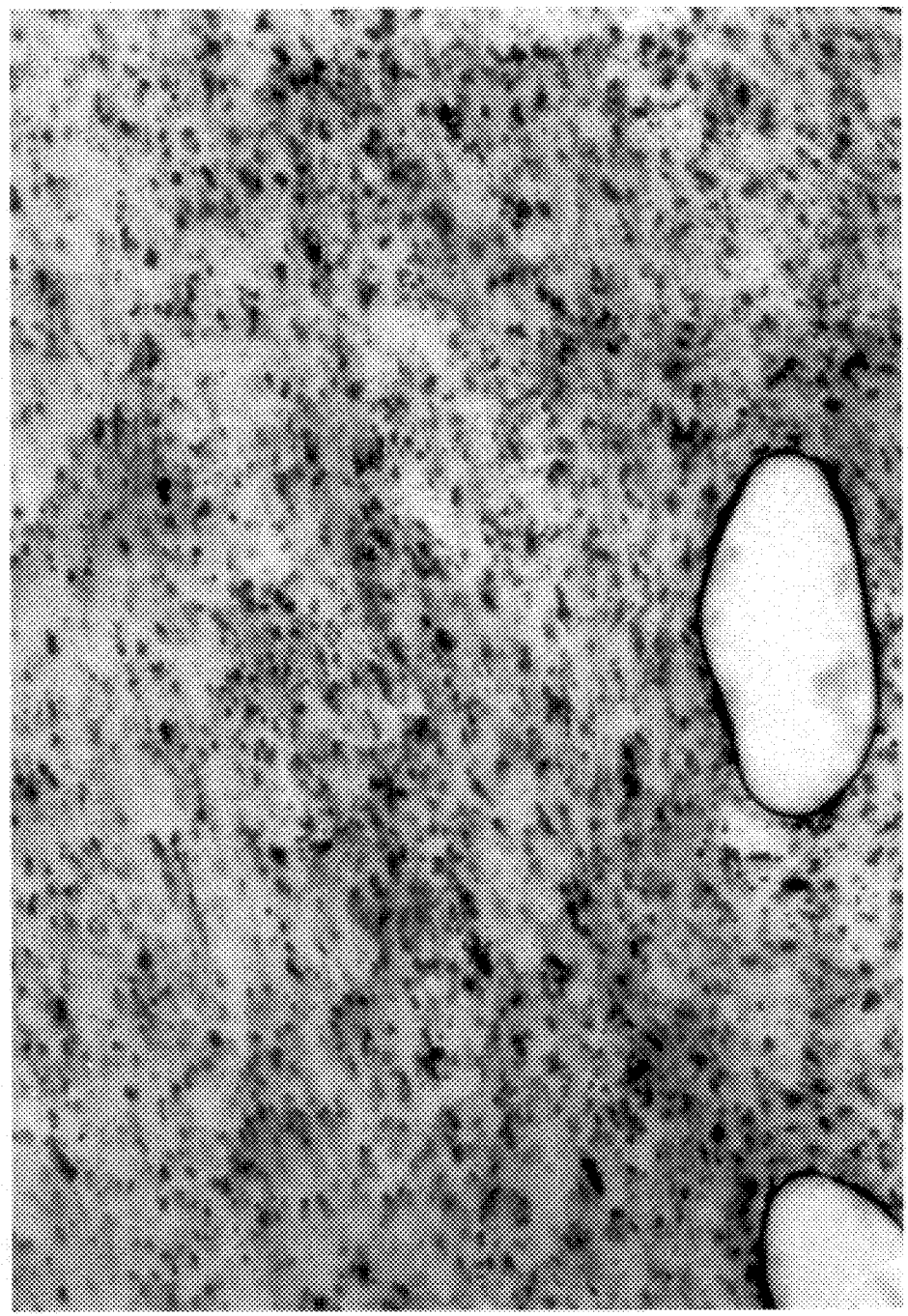
FIG. 5 is a micrograph (X200) showing the state of the ink prepared in Example 3, which is taken with a polarizing microscope.
Figure 6:
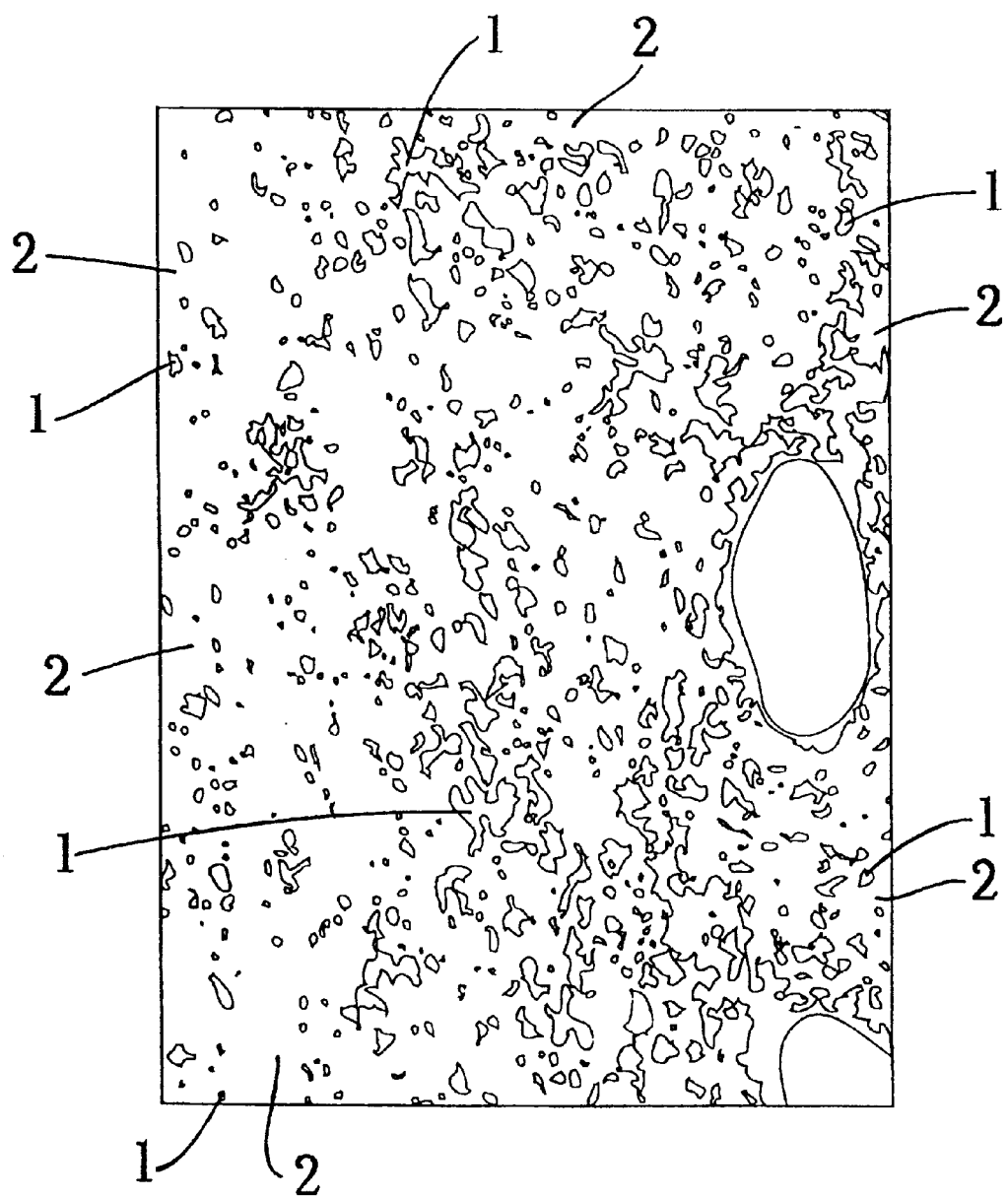
FIG. 6 is a schematic illustration based on FIG. 5, showing the state of the ink.
Figure 7:
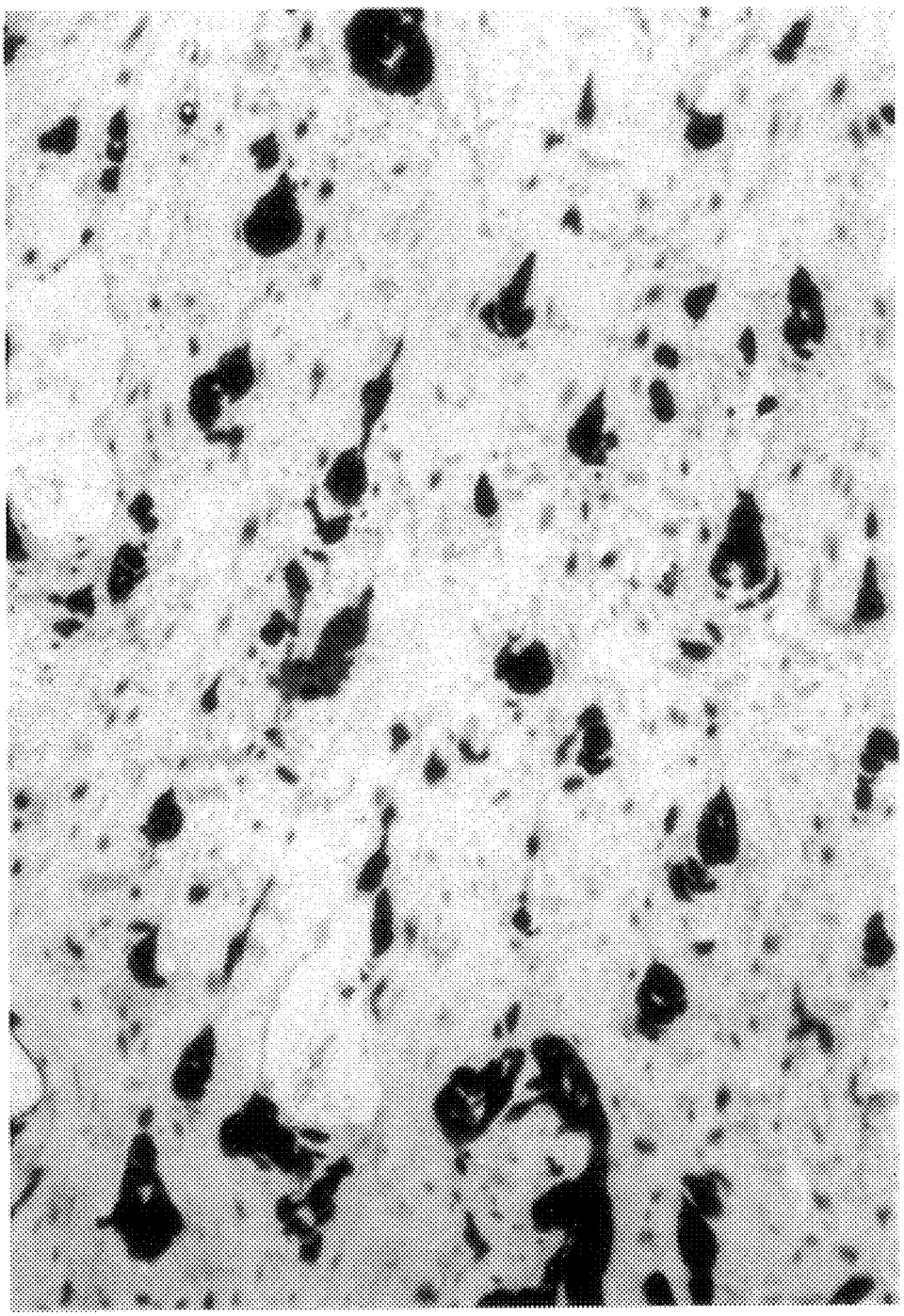
FIG. 7 is a micrograph (X200) showing the state of the ink prepared in Example 4, which is taken with a polarizing microscope.
Figure 8:
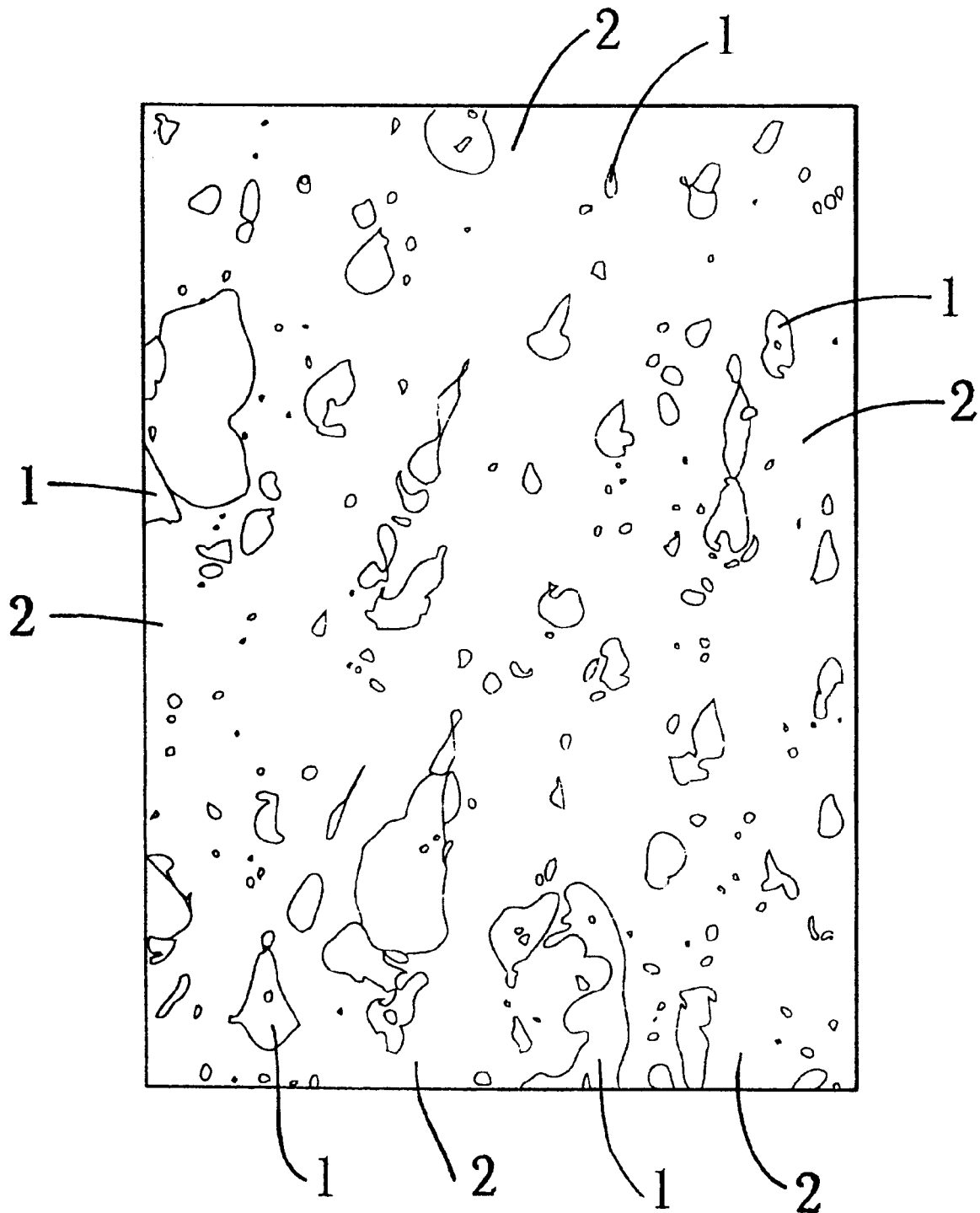
FIG. 8 is a schematic illustration based on FIG. 7, showing the state of the ink.
Figure 9:
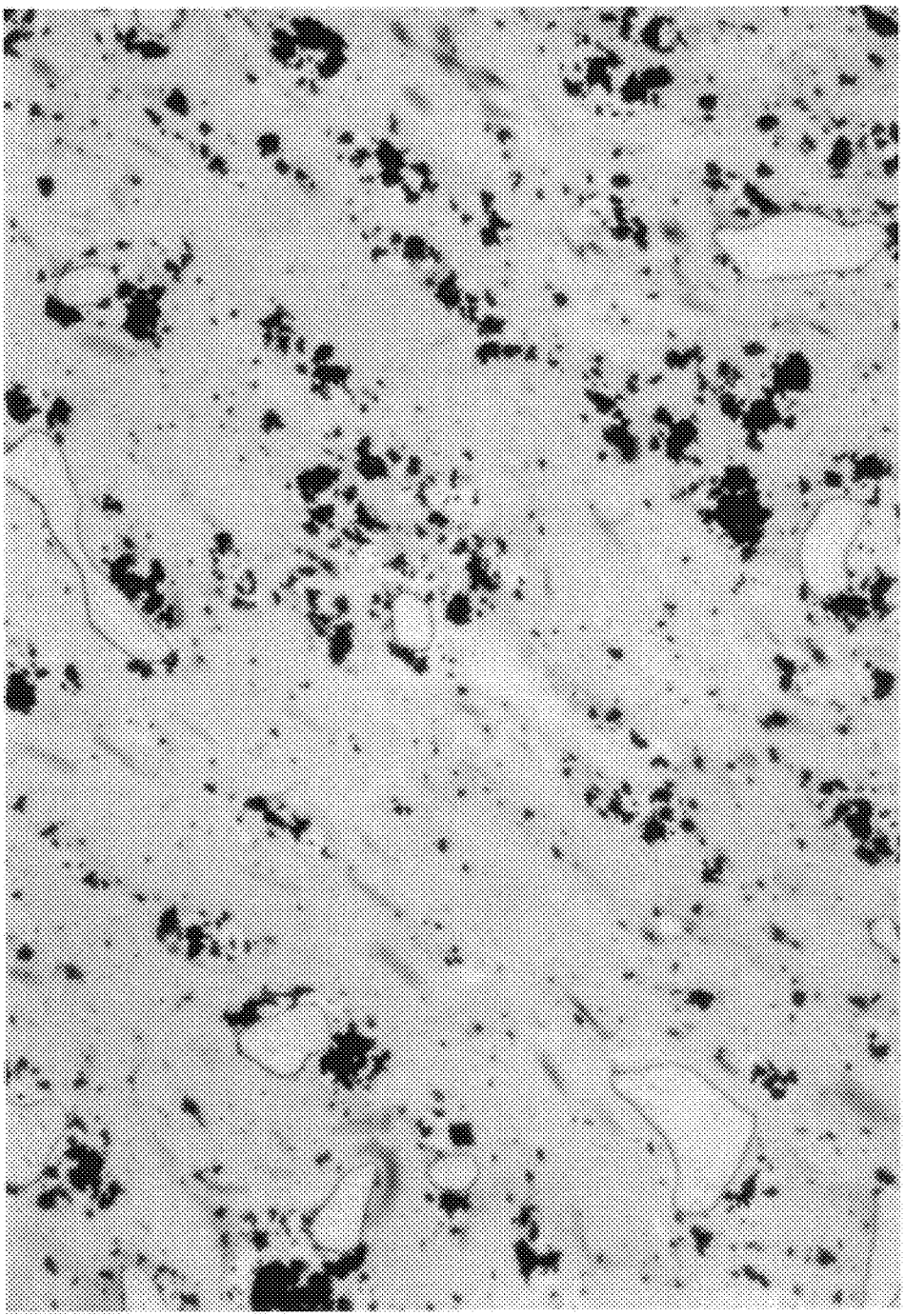
FIG. 9 is a micrograph (X200) showing the state of the ink prepared in Example 5, which is taken with a polarizing microscope.
Figure 10:
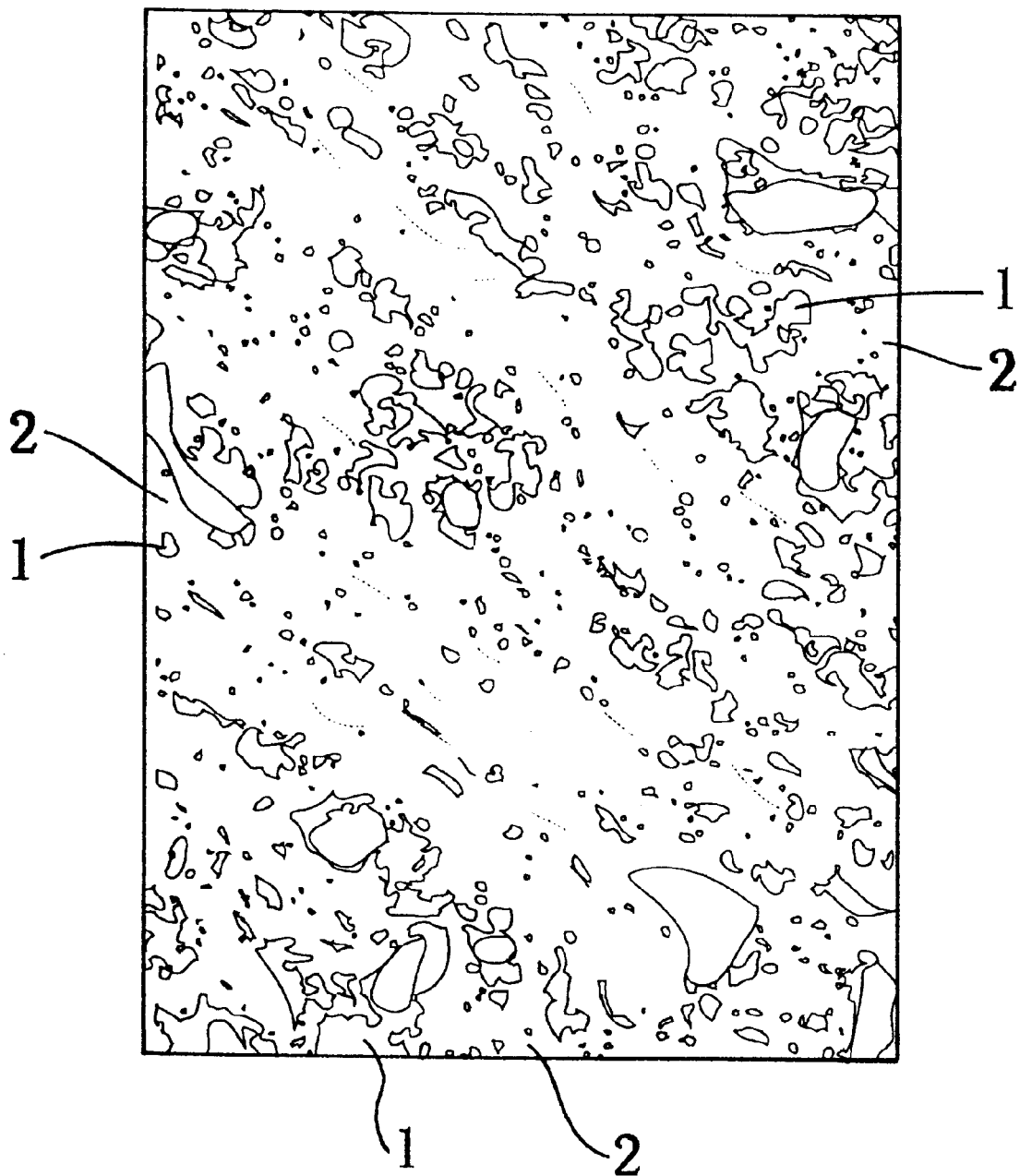
FIG. 10 is a schematic illustration based on FIG. 9, showing the state of the ink.
Figure 11:
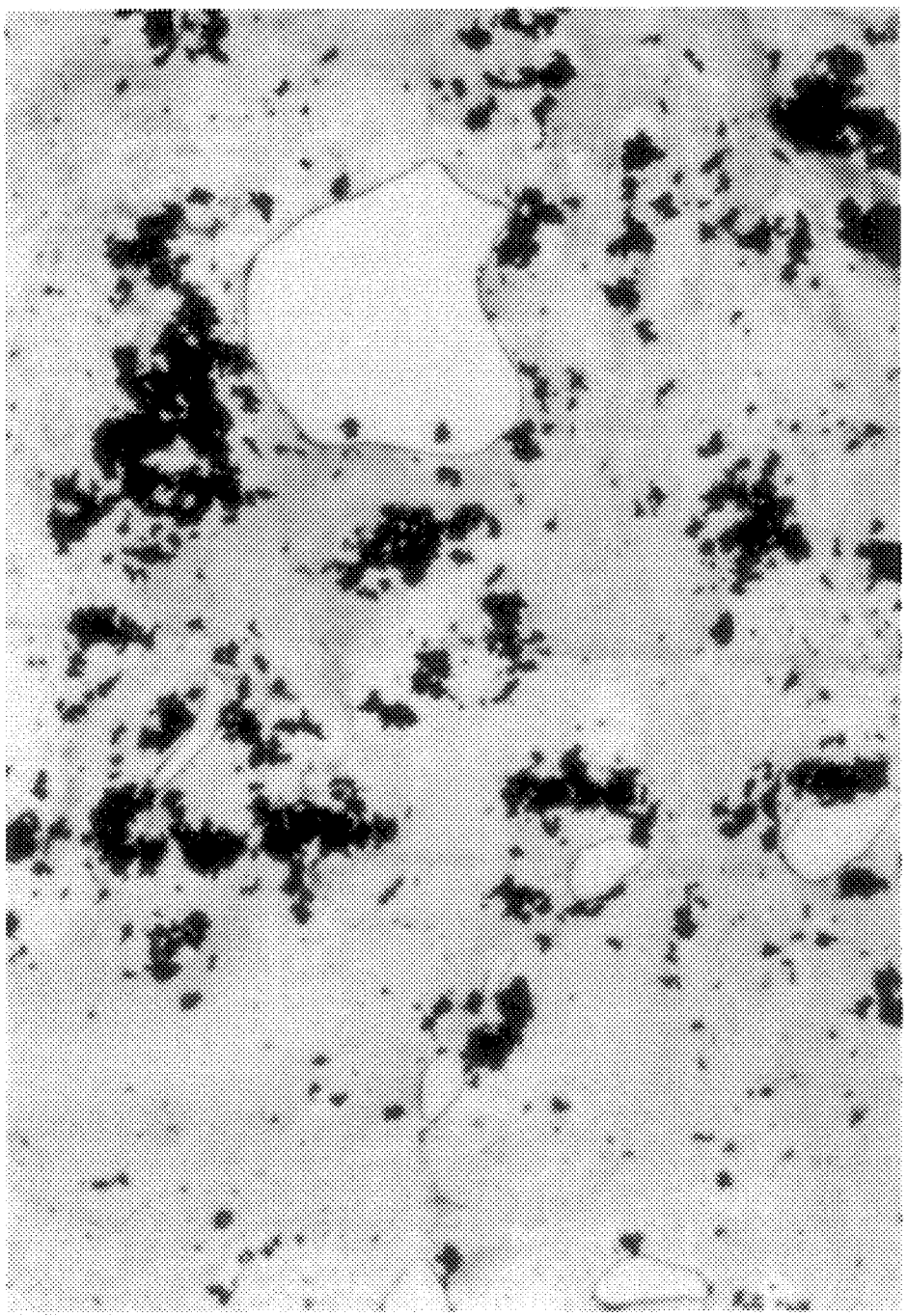
FIG. 11 is a micrograph (X200) showing the state of the ink prepared in Example 6, which is taken with a polarizing microscope.
Figure 12:
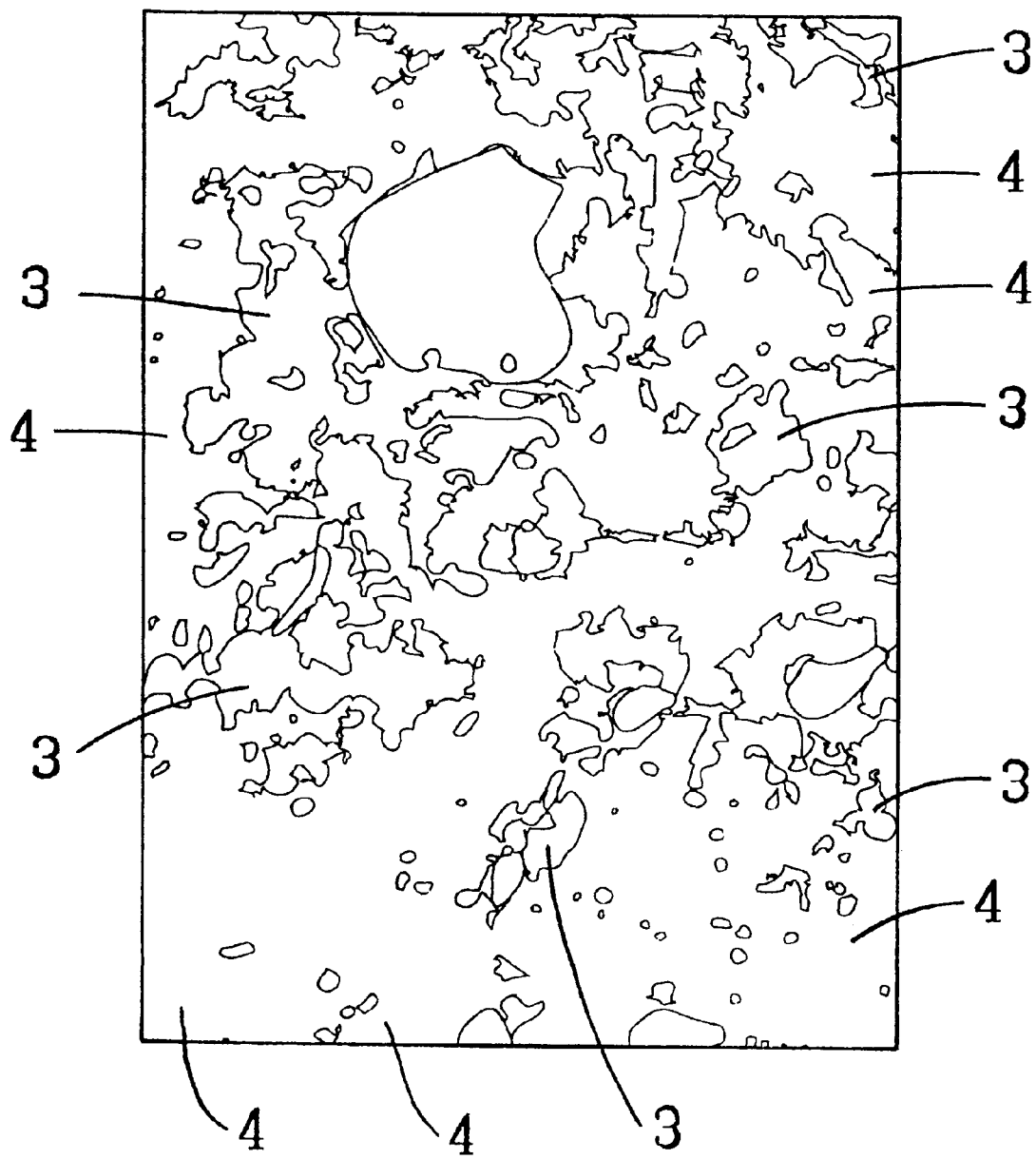
FIG. 12 is a schematic illustration based on FIG. 11, showing the state of the ink.
Figure 13:
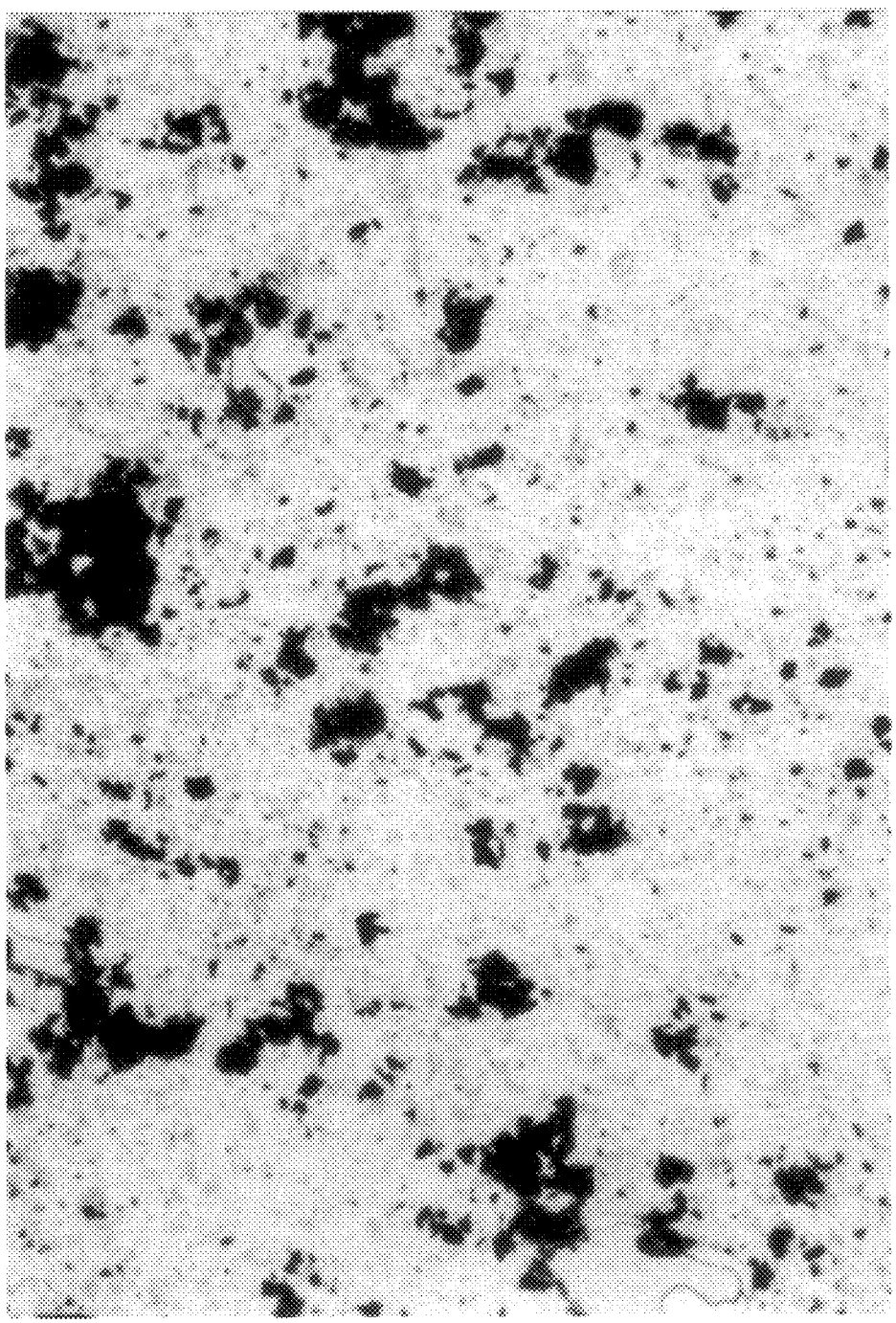
FIG. 13 is a micrograph (X200) showing the state of the ink prepared in Example 7, which is taken with a polarizing microscope.
Figure 14:
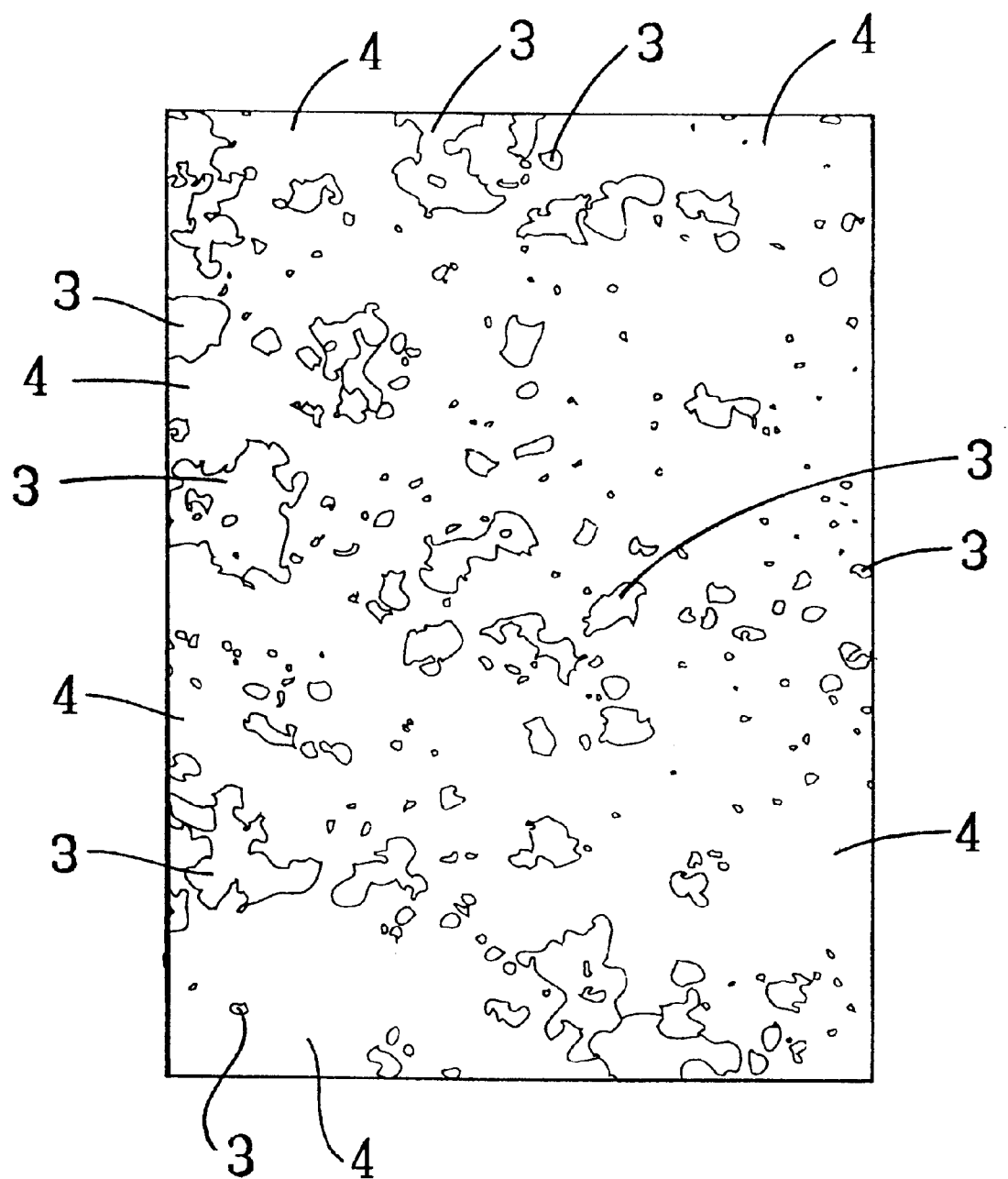
FIG. 14 is a schematic illustration based on FIG. 13, showing the state of the ink.
Figure 15:
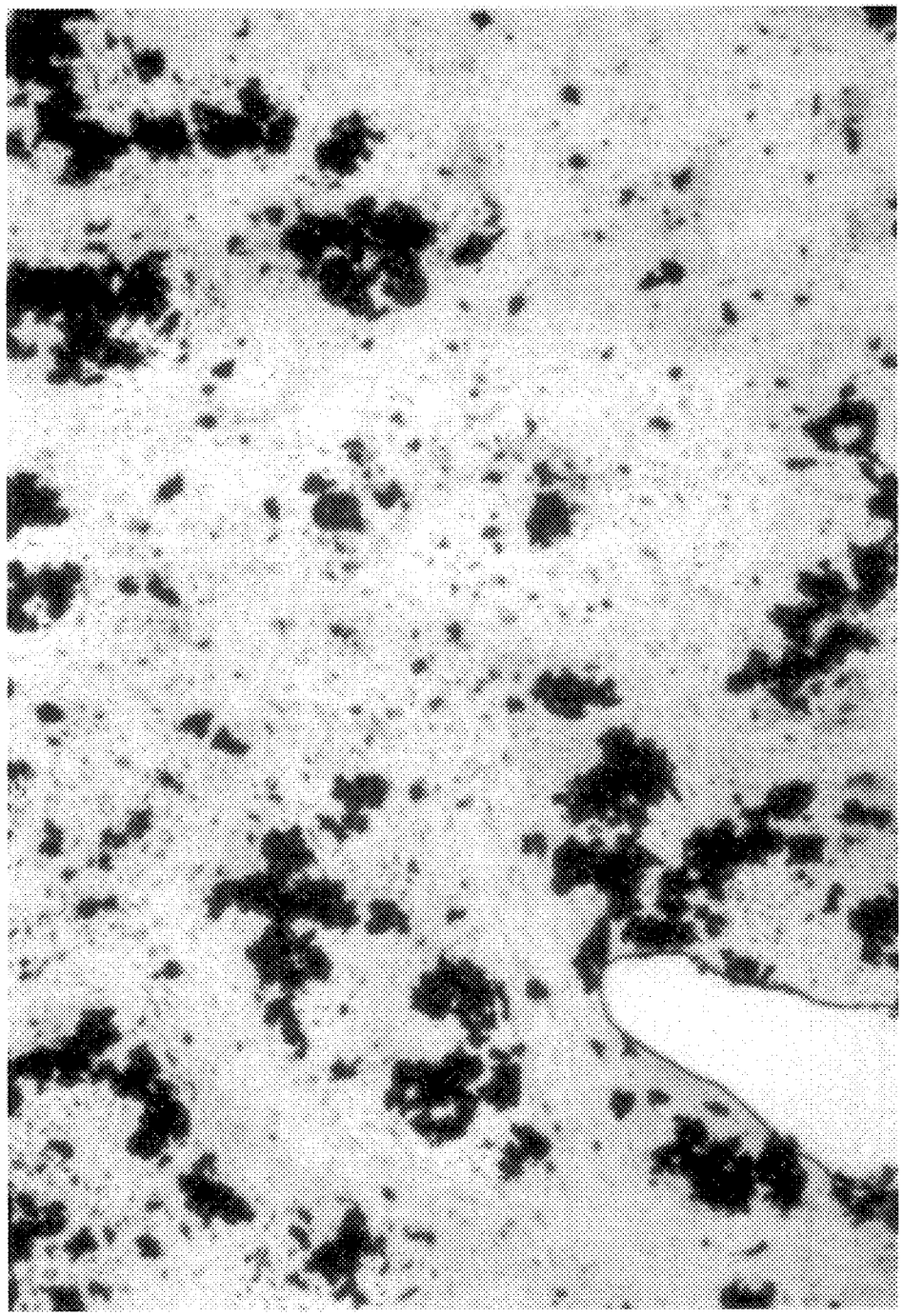
FIG. 15 is a micrograph (X200) showing the state of the ink prepared in Example 8, which is taken with a polarizing microscope.
Figure 16:
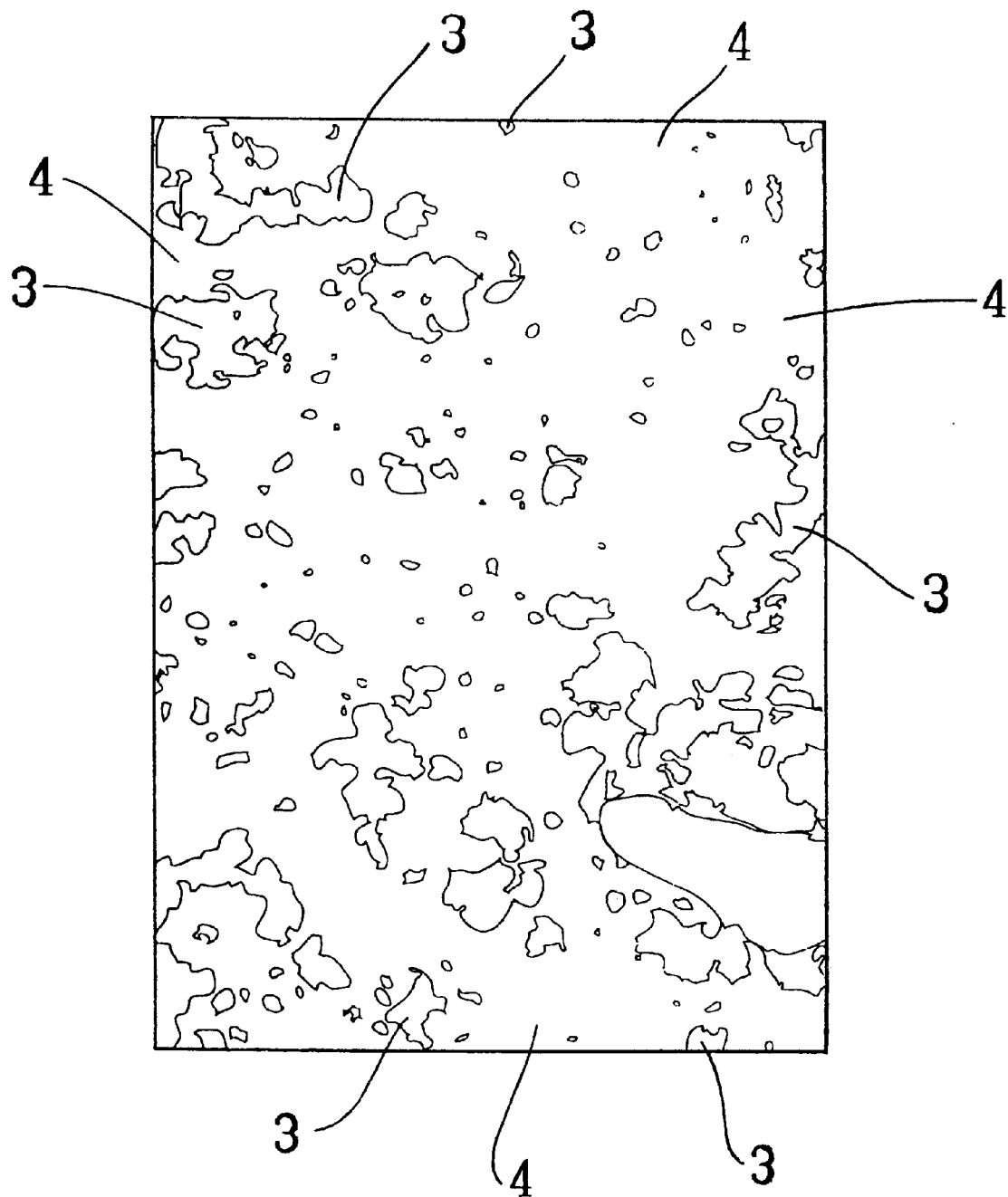
FIG. 16 is a schematic illustration based on FIG. 15, showing the state of the ink.
Figure 17:
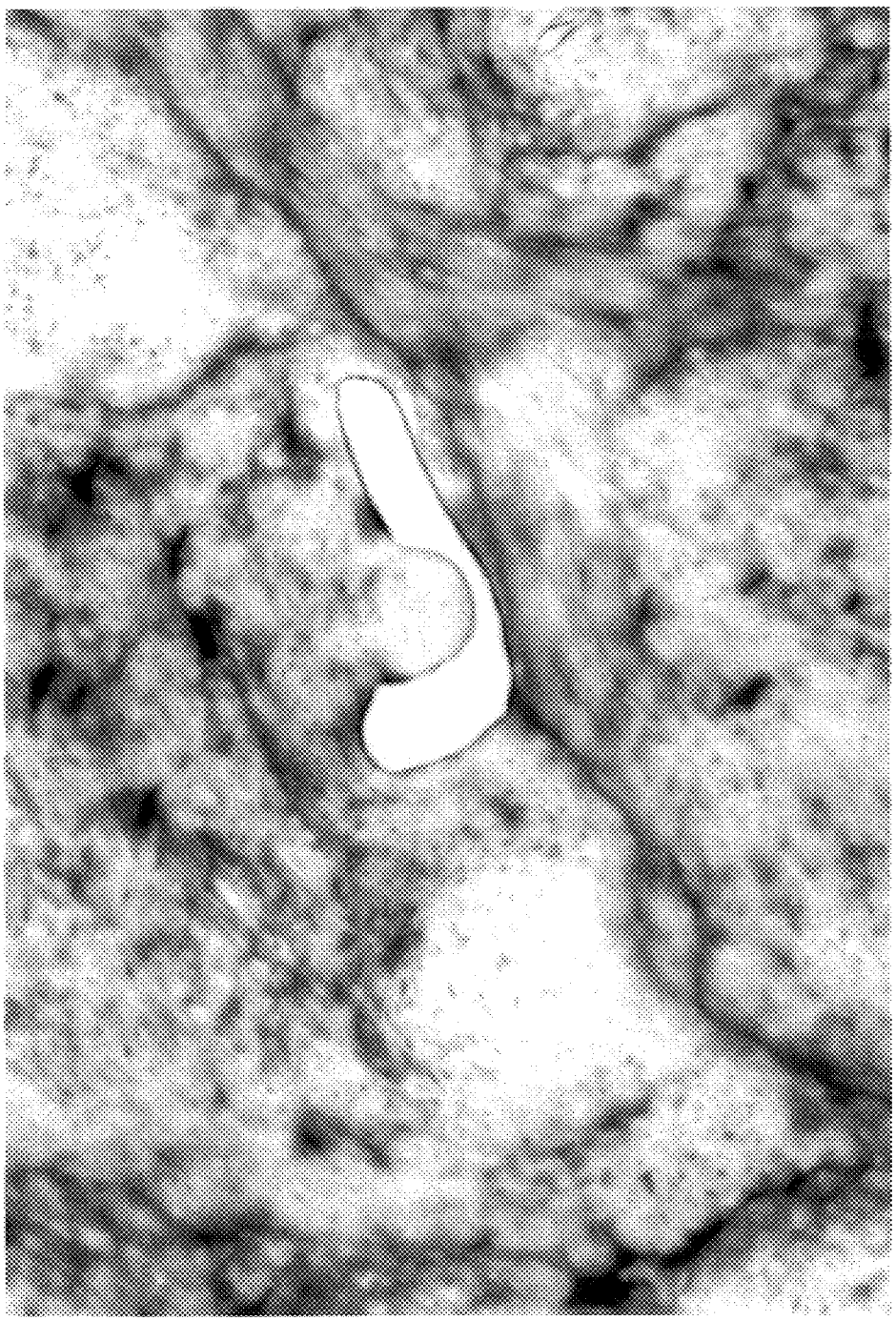
FIG. 17 is a micrograph (X200) showing the state of the ink prepared in Comparative Example 1, which is taken with a polarizing microscope.
Figure 18:
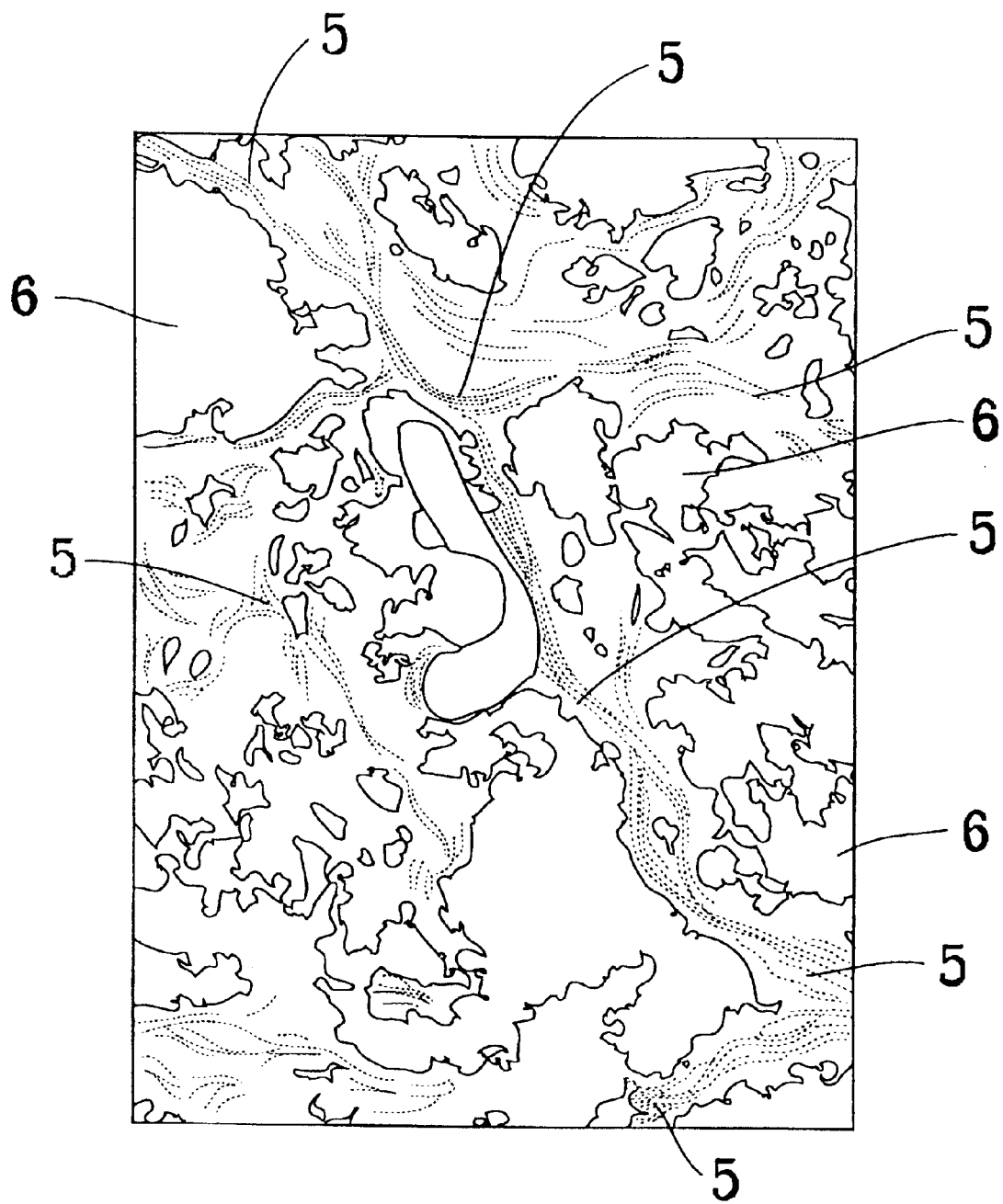
FIG. 18 is a schematic illustration based on FIG. 17, showing the state of the ink.
Figure 19:
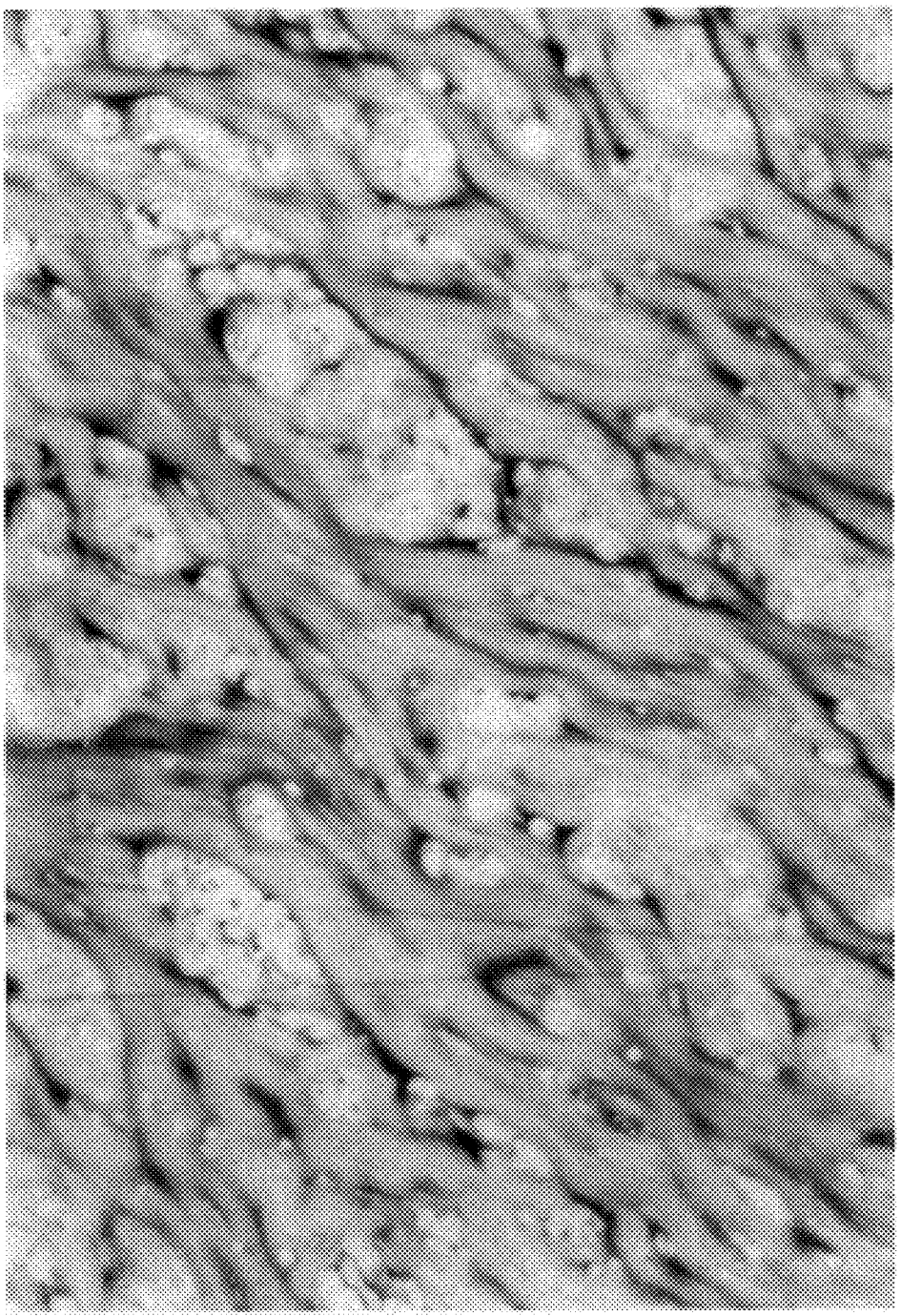
FIG. 19 is a micrograph (X200) showing the state of the ink prepared in Comparative Example 2, which is taken with a polarizing microscope.
Figure 20:
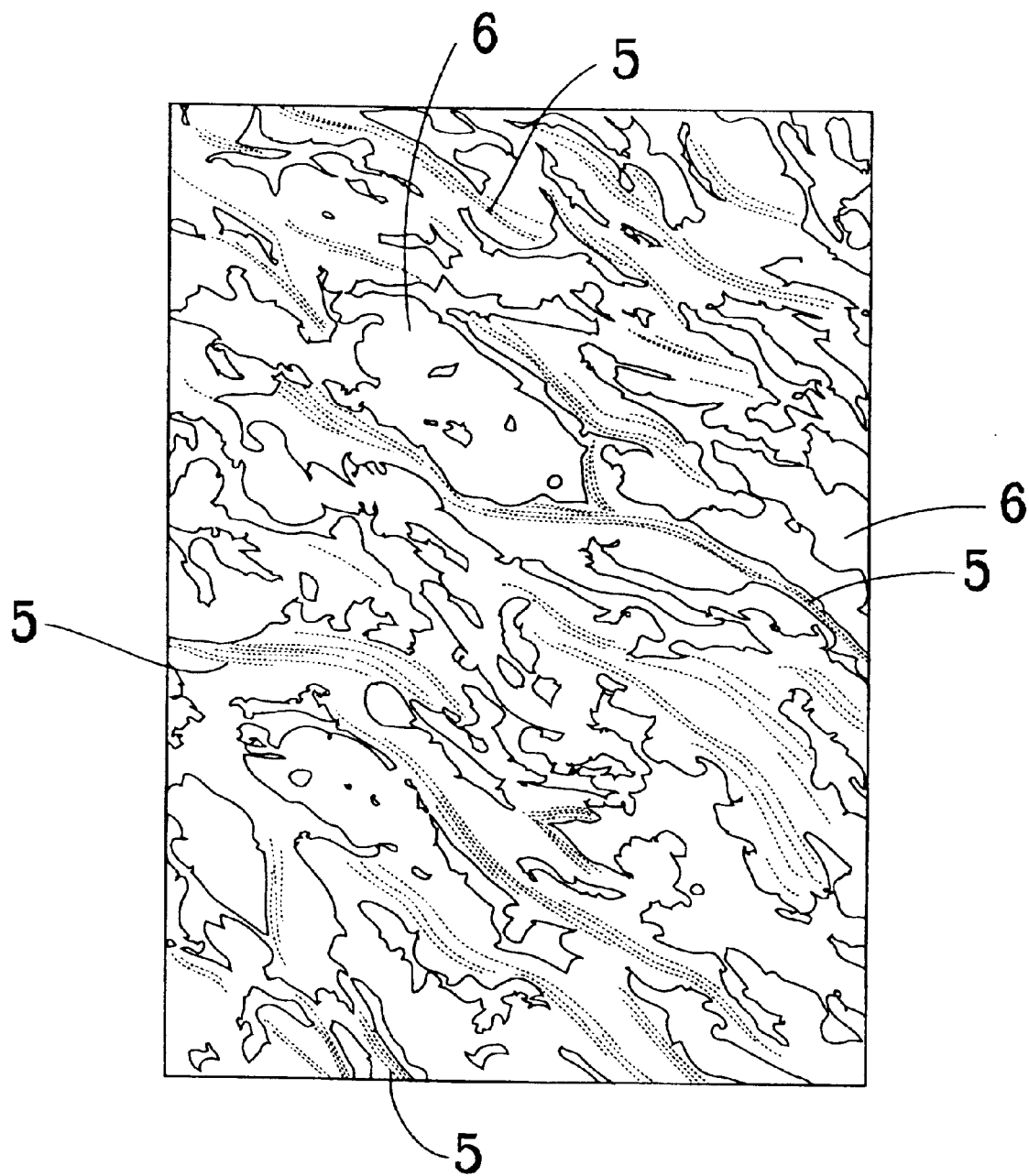
FIG. 20 is a schematic illustration based on FIG. 19, showing the state of the ink.
Figure 21:
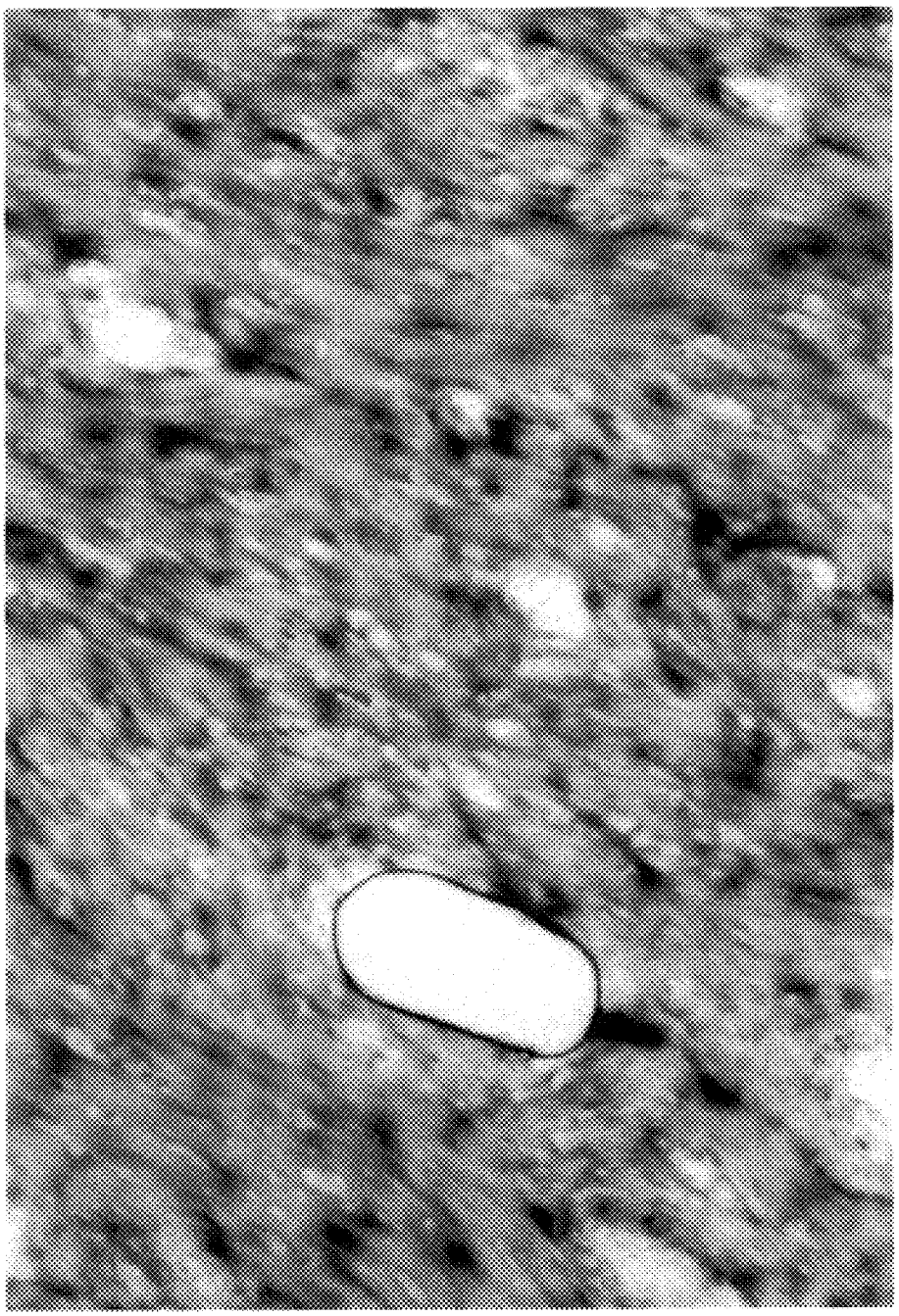
FIG. 21 is a micrograph (X200) showing the state of the ink prepared in Comparative Example 3, which is taken with a polarizing microscope.
Figure 22:
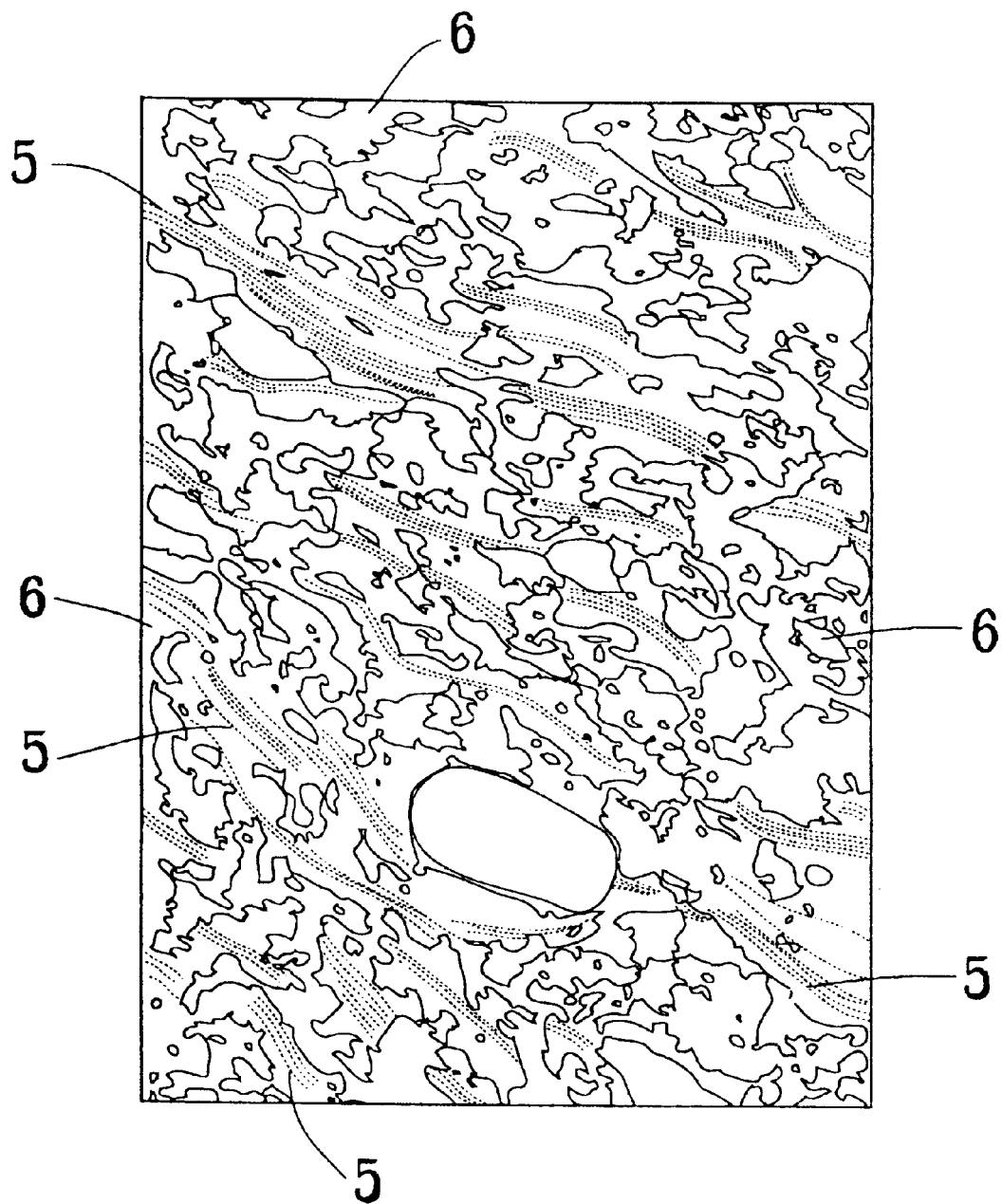
FIG. 22 is a schematic illustration based on FIG. 21, showing the state of the ink.
Figure 23:
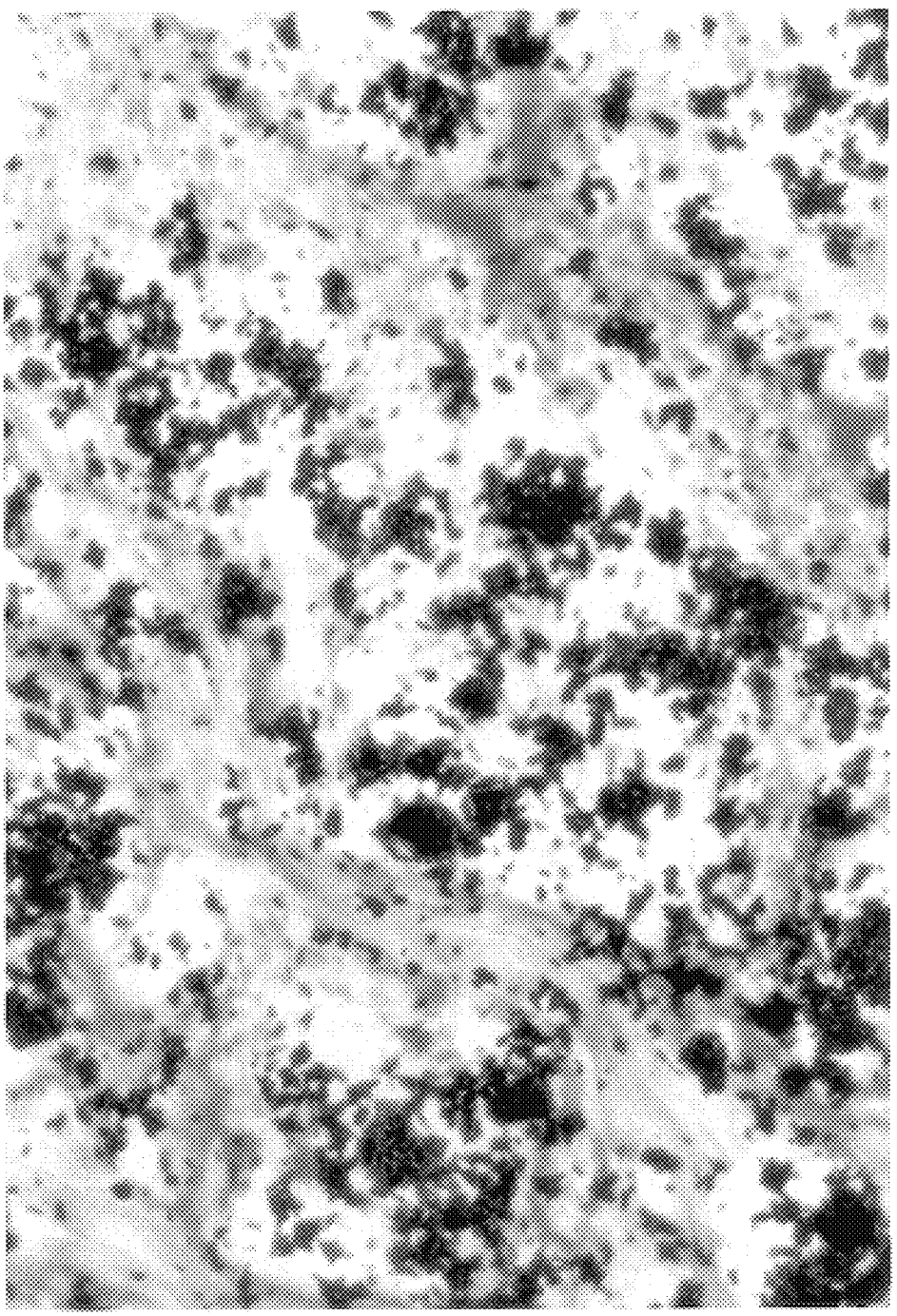
FIG. 23 is a micrograph substituted for drawing showing the state of the ink prepared in Comparative Example 4, which is taken with a polarizing microscope.
Figure 24:
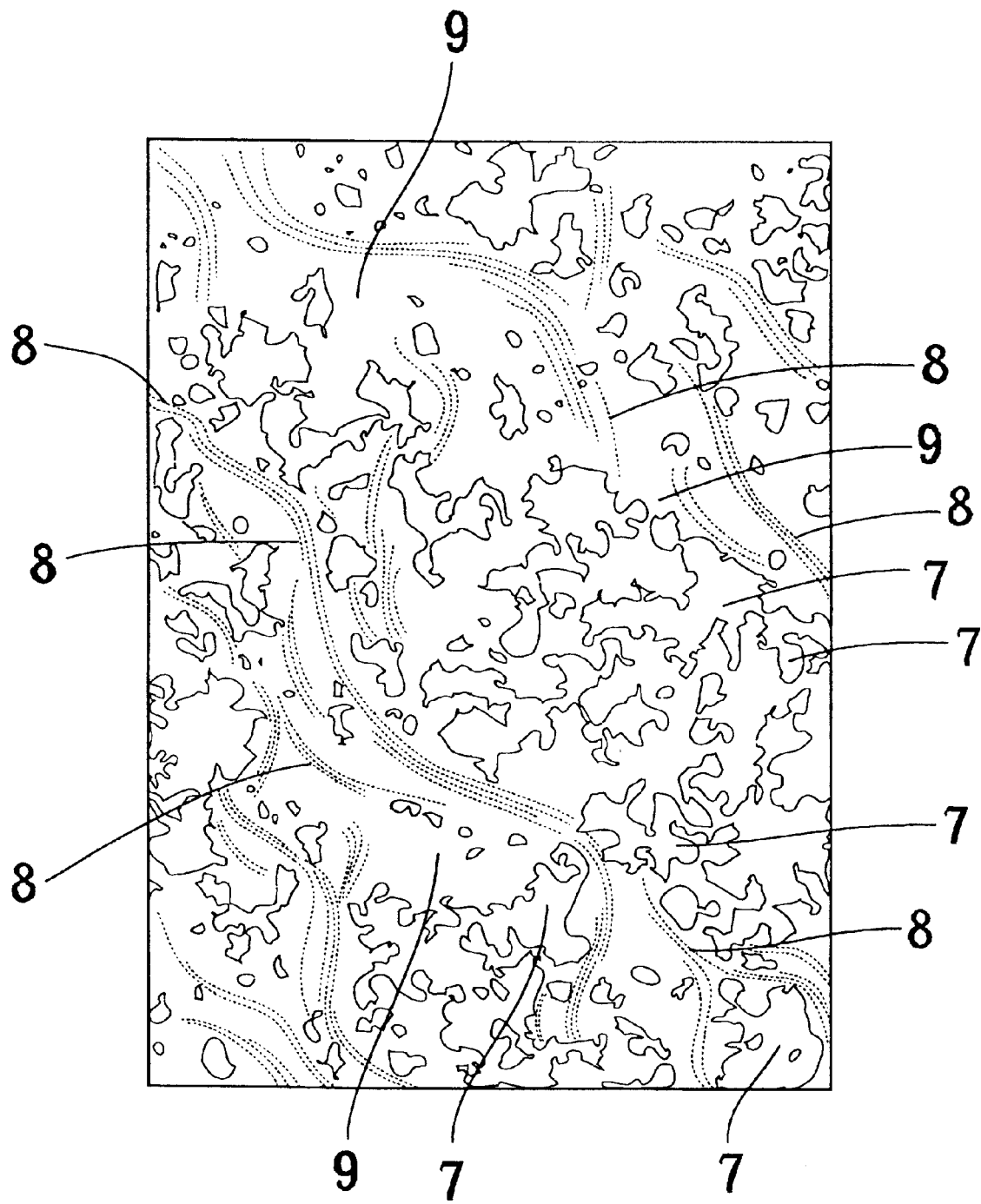
FIG. 24 is a schematic illustration based on FIG. 23, showing the state of the ink.

Two days after the preparation of these test samples, the states of the ink of each of the Examples and Comparative Examples were investigated at X200 magnification with a polarizing microscope (available from Nippon Kogaku K.K. under the trade name of "OPTIHOT XP-M"). The number shown in "micrograph of the state of the ink" in the Table 3 and Table 4 indicates the number of the Figure showing a micrograph of each of the Examples and Comparative Examples. FIG. 2 is a schematic illustration showing the state of the ink based on the micrograph of FIG. 1 and FIG. 4 is a schematic illustration showing the state of the ink based on the micrograph of FIG. 3. Similarly, FIGS. 6, 8, 10, 12, 14 and 16 are schematic illustrations showing the state of the ink based on the micrograph of Examples shown as FIGS. 5, 7, 9, 11, 13 and 15 respectively. FIG. 18, 20, 22, 24, 26 and 28 are schematic illustrations showing the state of the ink based on the micrograph of Comparative Examples shown as FIGS. 17, 19, 21, 23, and 27 respectively.

In those schematic illustrations based on the micrographs, 1 is a spotted agglomerate phase (pigment phase) wherein the pigment particles gather, 2 is a phase comprising polysaccharide (vehicle phase), 3 is a complex agglomerate phase wherein pigment particles of a coloring pigment and those of a metallic powder pigment gather and form the same spotted pigment phase, 4 is a phase comprising polysaccharide (vehicle phase), 5 is a pigment phase that forms a belt-shaped stream (separated pigment phase), 6 is a phase comprising polysaccharide (vehicle phase), 7 is a pigment phase of a metallic powder pigment, 8 is a belt-shaped pigment phase of the coloring pigment that is flowing between the pigment phases 7, and 9 is a phase comprising polysaccharide (vehicle phase).

In the test of the stability to storage, those test samples were all allowed to stand with the pen tip oriented downward. First, their state was evaluated before the test. Then, after they were stored for one week at 50° C., their stability to storage was evaluated. The other samples were stored for one year at a room temperature and then evaluated for their stability to storage. The results of the evaluation of Examples and Comparative Examples are shown in Table 3 and Table 4.

TABLE 3

| | polarizing micrograph showing the state of ink | particle diameter (μm) | | | Before the test Writing portion | After 1 week at 50° C. Writing portion | After 1 year at room temperature | | | |
|---|---|---|---|---|---|---|---|---|---|---|
| | | min | max | average | | | Writing portion | Ink flow | appearance | Leakage of ink |
| Ex. 1 | Agglomerate phase of a coloring pigment (FIG. 1) | 0.5 | 25 | 13 | blue | blue | Blue | no change | no change | no |
| Ex. 2 | Agglomerate phase of a coloring pigment (FIG. 3) | 0.5 | 15 | 8 | blue | blue | Blue | no change | no change | no |
| Ex. 3 | Agglomerate phase of a coloring pigment (FIG. 5) | 0.5 | 10 | 5 | red | red | Red | no change | no change | no |
| Ex. 4 | Agglomerate phase of a coloring pigment (FIG. 7) | 0.5 | 30 | 14 | red | red | Red | no change | no change | no |
| Ex. 5 | Complex agglomerate phase of a coloring pigment and a metallic powder pigment (FIG. 9) | 1 | 20 | 10 | Blue with metallic luster | Blue with metallic luster | Blue with metallic luster | no change | no change | no |
| Ex. 6 | Complex agglomerate phase of a coloring pigment and a metallic powder pigment (FIG. 11) | 1 | 25 | 11 | Blue with metallic luster | Blue with metallic luster | Blue with metallic luster | no change | no change | no |
| Ex. 7 | Complex agglomerate phase of a coloring pigment and a metallic powder pigment (FIG. 13) | 1 | 25 | 13 | Red with metallic luster | Red with metallic luster | Red with metallic luster | no change | no change | no |
| Ex. 8 | Complex agglomerate phase of a coloring pigment and a metallic powder pigment (FIG. 15) | 1 | 25 | 13 | Red with metallic luster | Red with metallic luster | Red with metallic luster | no change | no change | no |

TABLE 4

Figure 25:
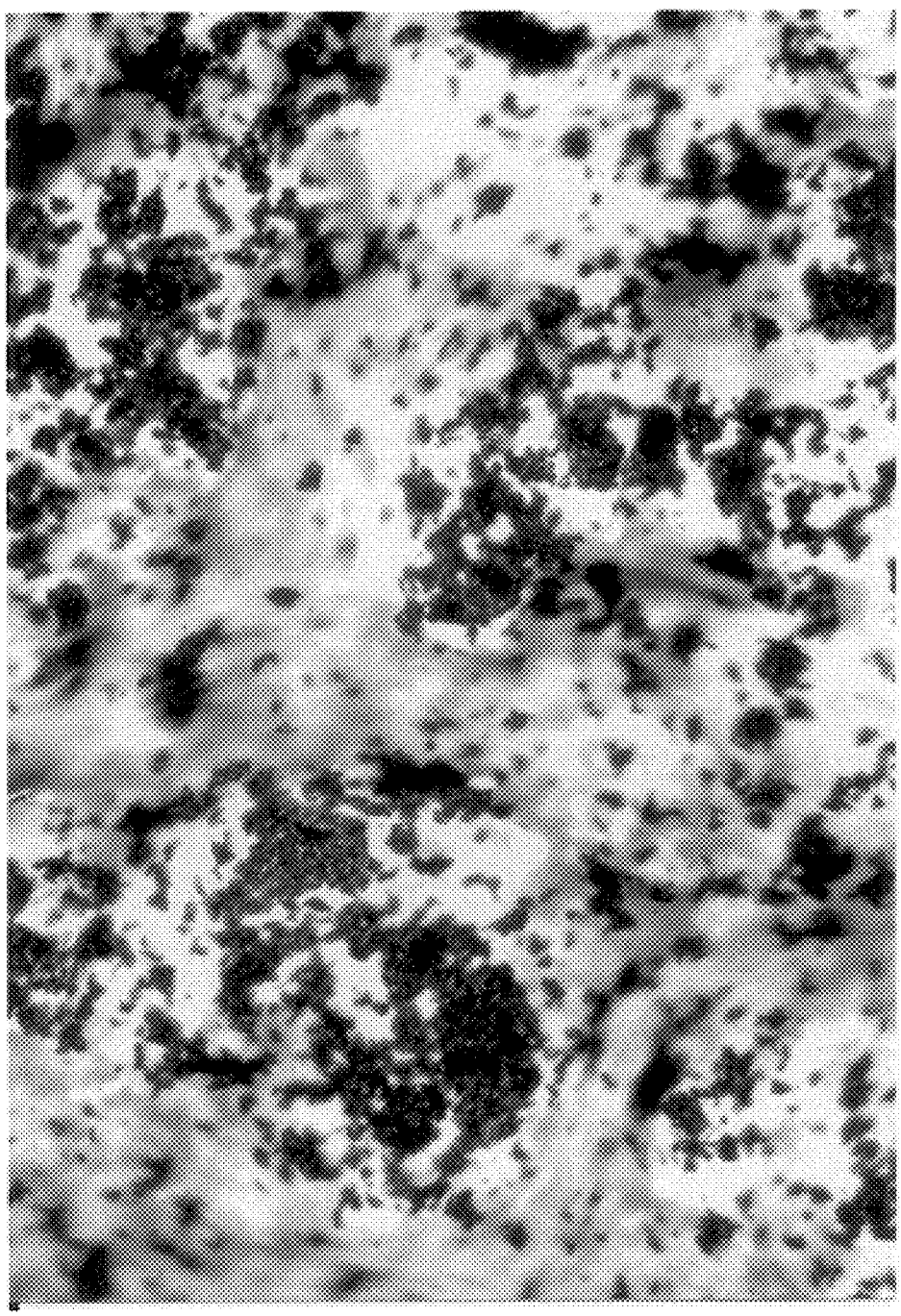
FIG. 25 is a micrograph substituted for drawing showing the state of the ink prepared in Comparative Example 5, which is taken with a polarizing microscope.
Figure 26:
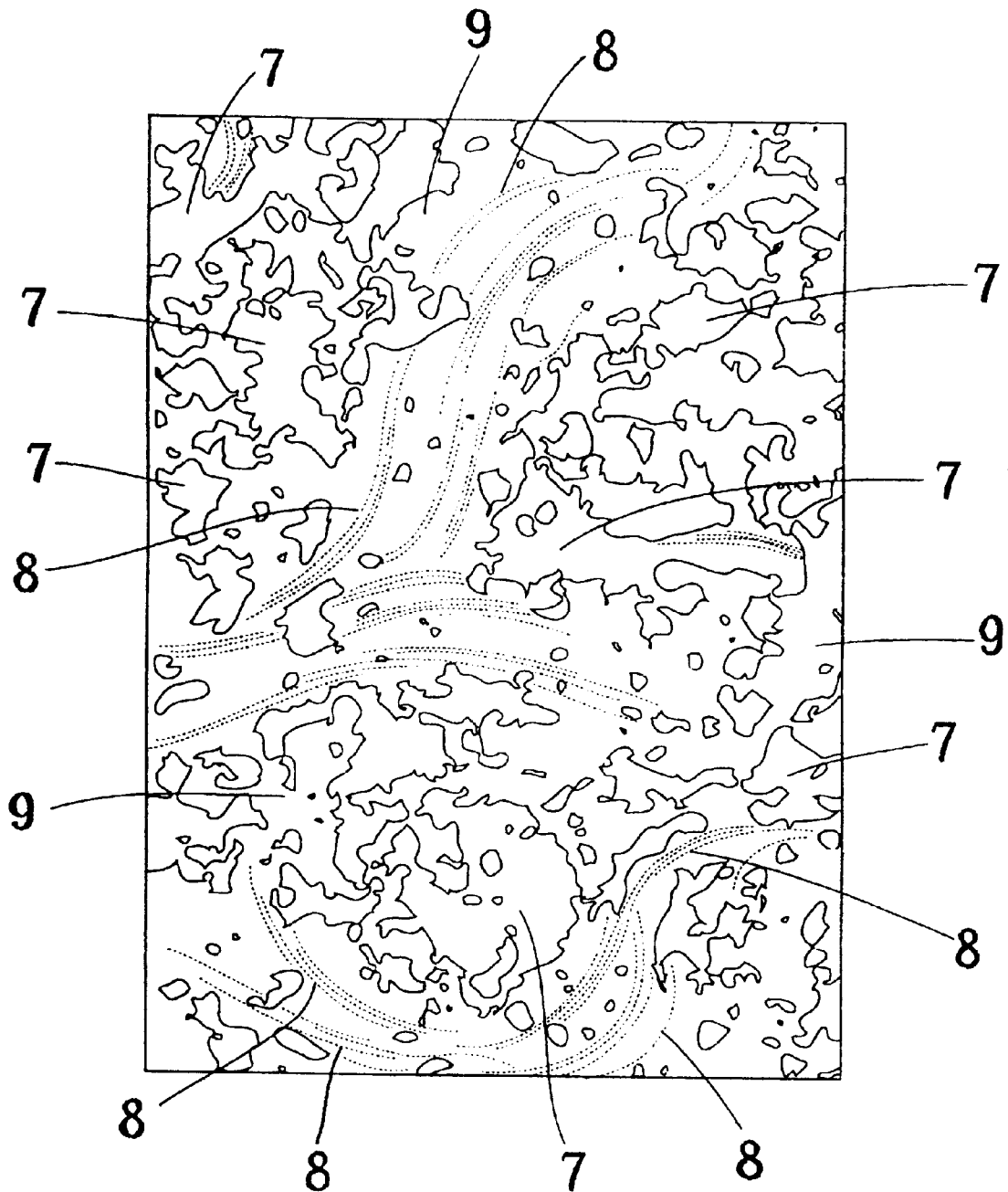
FIG. 26 is a schematic illustration based on FIG. 25, showing the state of the ink.
Figure 27:
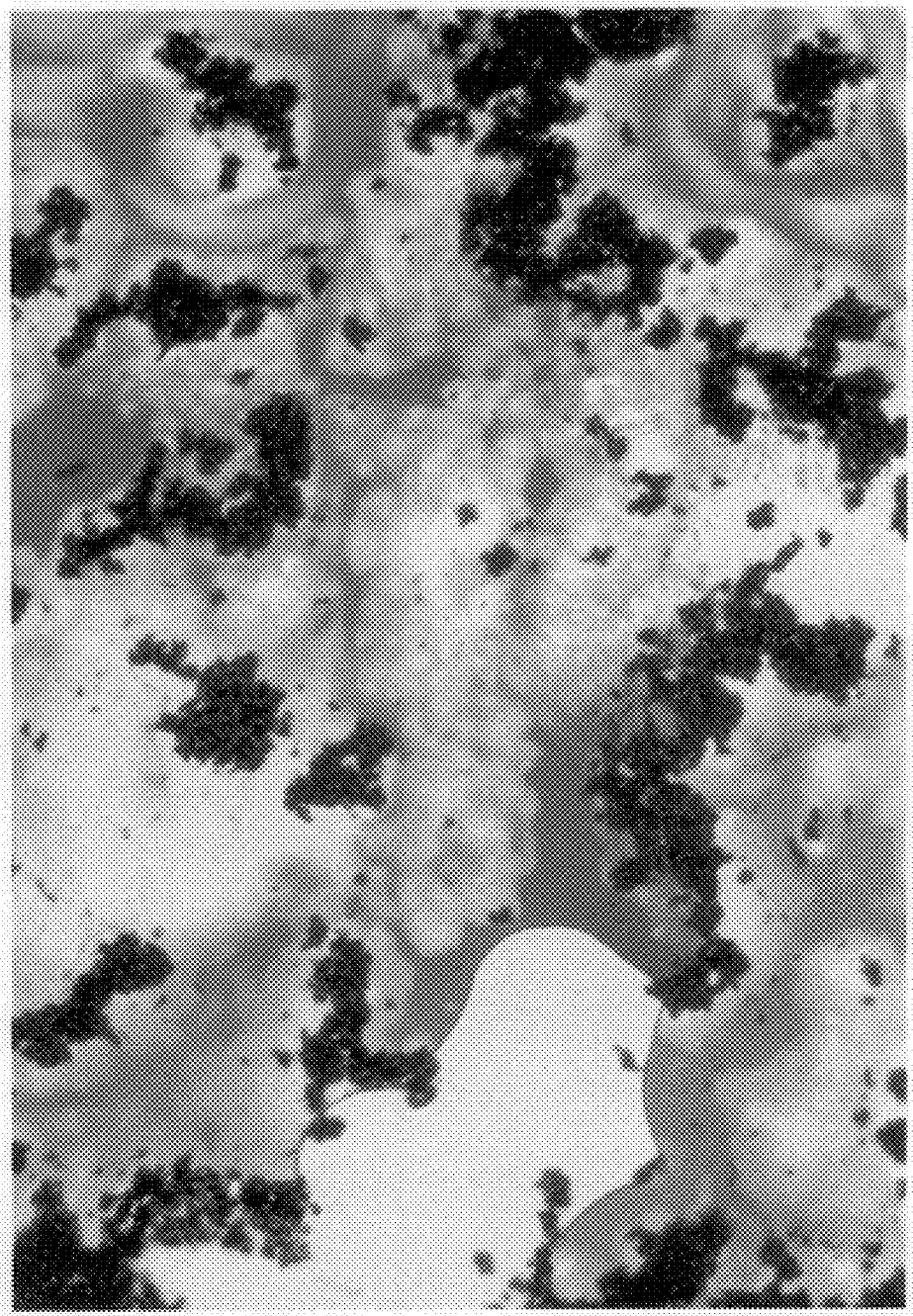
FIG. 27. is a micrograph (X200) showing the state of the ink prepared in Comparative Example 6, which is taken with a polarizing microscope.
Figure 28:
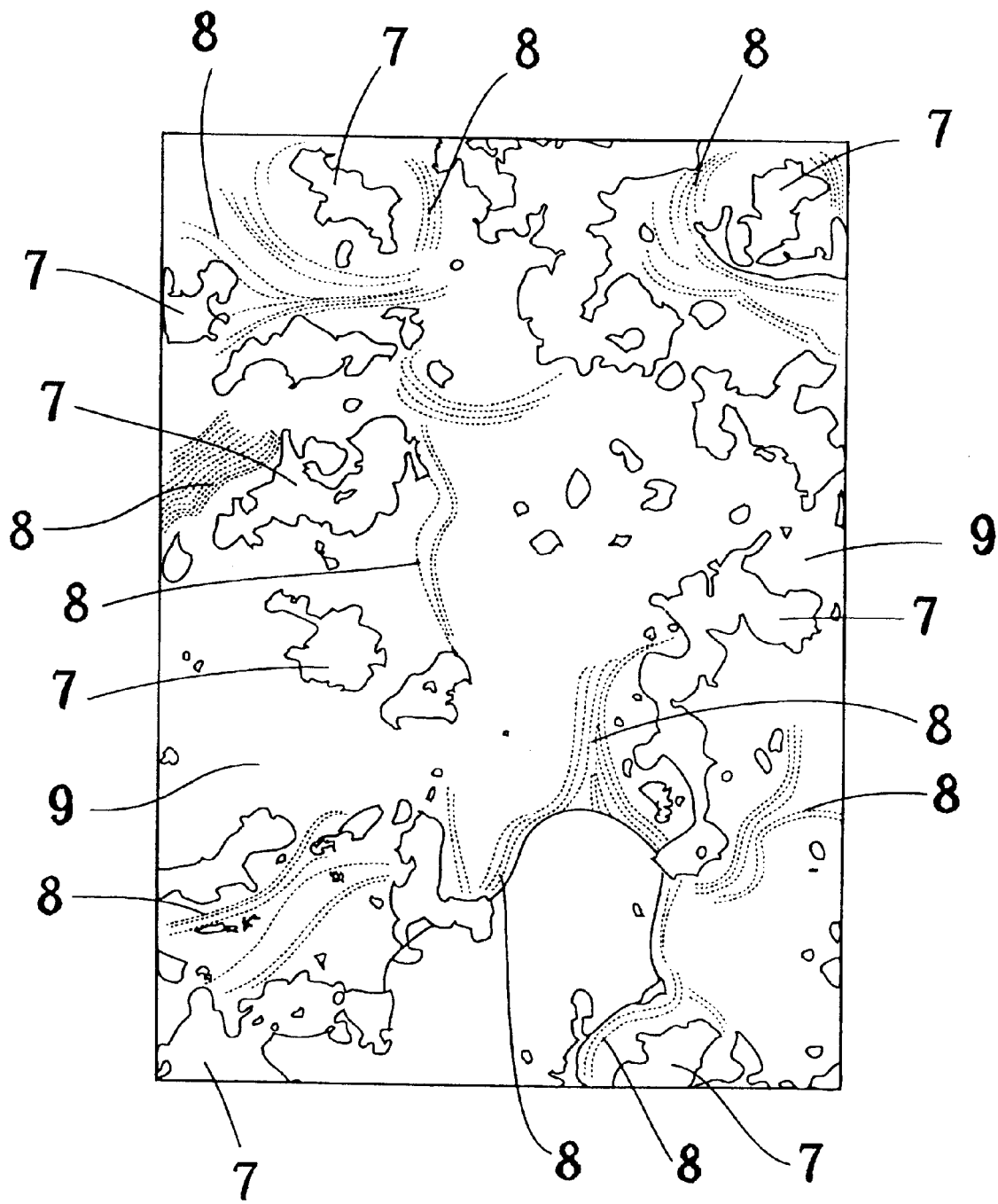
FIG. 28 is a schematic illustration based on FIG. 27, showing the state of the ink.

| | polarizing micrograph showing the state of ink | Before the test Writing potion | After 1 week at 50° C. Writing potion | After 1 year at room temperature | | | Ink leakage |
|---|---|---|---|---|---|---|---|
| | | | | Writing potion | Ink flow | appearance | |
| Com. Ex. 1 | FIG. 17 | blue | dark blue | Dark blue | Excess ink flow | No change | yes |
| Com. Ex. 2 | FIG. 19 | blue | blue | Dark blue | Excess ink flow | No change | yes |
| Com. Ex. 3 | FIG. 21 | red | red | Dark red | Excess ink flow | No change | yes |
| Com. Ex. 4 | FIG. 23 | Blue with metallic luster | Dark blue (with no metallic luster) | Dark blue (with no metallic luster) | Excess ink flow | Separation of coloring agent | yes |
| Com. Ex. 5 | FIG. 25 | Blue with metallic luster | blue (with no metallic luster) | Dark blue (with no metallic luster) | Excess ink flow | Separation of coloring agent | yes agent |
| Com. Ex. 6 | FIG. 27 | Red with metallic luster | red (with no metallic luster) | Dark red (with no metallic luster) | Excess ink flow | Separation of coloring agent | yes |

As can be understood from the mentioned micrograph, in the ink of Examples 1–4, pigment particles of the coloring pigment gather and form a spotted agglomerate phase. Further, the mentioned spotted agglomerate phase forms a pigment phase. The particle diameter of the agglomerate phase formed in Examples 1–4 is 0.5 μm to 3 μm as an actual measurement based on the micrograph (X200). And the average particle diameter of the agglomerate phase formed in Examples 1–4 is 5 μm to 14 μm as an actual measurement based on the micrograph (X200).

On the other hand, the ink of Comparative Examples 1–3 has a belt-shaped pigment phase different from the spotted phase as shown in the micrograph. Comparing the ink of Example 1–4 with those of Comparative Examples 1–3 before the test, their "writing portions" show the same color. However, the "writing portion" after 1 week of storage at 50° C., exhibit dark blue color in Comparative Example 1 and the change of color is observed. After 1 year of storage at room temperature, the inks of Examples 1–4 doesn't show any change regarding "writing portion" nor "ink flow" from the pen tip of the ball point pen. There is no change in their outward "appearance" and no leakage of ink. On the other hand, the inks of Comparative Examples 1–3 changed their color to dark blue or dark red and caused ink leakage while showing no large change of "appearance".

With those inks of Comparative Examples 4–6, the pigment particles of the aluminum powder pigment are dispersed inhomogeneously, forming the agglomerate phase independent from the belt-shaped stream of the coloring pigment. On the other hand, with the ink of Examples 5–8, there is no belt-shaped stream of the coloring pigment as can be seen in the above-mentioned Comparative Examples. The pigment phase containing the agglomerate phase of the aluminum powder pigment is colored blue or red by the coloring pigment. That is, the pigment phase has the complex agglomerate phase wherein the agglomerate of the coloring pigment particles combine with the agglomerate of the aluminum powder pigment particles. The particle diameter of the agglomerate phase formed in Examples 5–8 is 1 μm to 25 μm as an actual measurement based on the micrograph (X200). And the average particle diameter of the agglomerate phase formed in Examples 5–8 is 10 μm to 13 μm as an actual measurement based on the micrograph (X200).

Those inks prepared in Examples 5–8 are compared with those prepared in Comparative Examples 4–6.

As can be understood from Table 3 and 4, the Examples 5–8 and the Comparative Examples 4–6 exhibit color with metallic luster and uniform writing portion before the test. After 1 week of storage at 50° C., the inks of the Examples 5–8 maintain the metallic luster as before the test. However, the ink of Comparative Example 4 has changed its color to the dark blue with no metallic luster while those of Comparative Examples 5 and 6 maintain the same color with metallic luster. After 1 year of storage at room temperature, the inks of Examples 5–8 do not exhibit any change of "writing portion" and "ink flow" from the pen tip of the ball point pen compared to their state before the storage. There is no change in outward "appearance" and no "leakage of ink". On the other hand, the ink of Comparative Examples 4–6 changed to the ink with dark blue or dark red color without metallic luster and exhibited an excess ink flow out from the pen tip after 1 year of storage at room temperature. The outward appearance deteriorates because the low viscosity component with condensed color containing an excessive amount of the coloring pigment separates from the high viscosity component containing excessive amount of the aluminum pigment. Moreover, the Comparative Examples 4–6 after 1 year of storage at room temperature cause the leakage of the ink.

Considering the above-mentioned results, it can be understood that the stability against long-term storage of the ink is significantly affected by the forming state or gathering state of the coloring pigment phase. In case of the ink wherein the pigment particles of the coloring pigment gather to form a spotted agglomerate phase and the pigment phase includes this agglomerate phase, the color of the writing portion is stable and the ink flow and outward appearance is appropriate and the leakage of ink does not occur as mentioned above. On the other hand, with the ink of the Comparative Examples wherein the coloring pigment forms the inhomogeneous belt-shaped phase (pigment phase), the segregation appears in the writing portion because of this inhomogeneous belt-shaped phase. Further, the inhomogeneous belt-shaped phase develops during the long-term storage and the low viscosity component containing the excess amount of the coloring pigment separates more and more. Then, after 1 year of storage at room temperature, the ink exhibit a dark blue or dark red color, excess ink flow and ink leakage.

In the case of the ink containing aluminum powder pigment, the stability against long-term storage is significantly affected by the forming state or gathering state of the coloring pigment phase as well. With the ink wherein the pigment particles of both the coloring pigment and the metallic powder pigment gather to the same pigment phase and form the complex agglomerate phase, the writing portion exhibits the color of the ink or the color with metallic luster, the ink flow and the outward appearance is appropriate and the ink leakage does not occur. On the other hand, in the case of the ink of the Comparative Examples wherein the coloring pigment forms the inhomogeneous belt-shaped phase (pigment phase) separately from the aggregation of the aluminum powder pigment, the segregation occurs because of the inhomogeneous belt-shaped phase of the coloring pigment. This inhomogeneous belt-shaped phase of the coloring pigment develops during long-term storage and the low viscosity component containing the excess amount of the coloring pigment separates more and more from the high viscosity component containing the aluminum powder pigment. Therefore, after 1 year of storage at room temperature, the ink exhibit dark blue or dark red which is the color of this low viscosity component containing excess amount of the coloring pigment, excess ink flow and ink leakage.

From the Examples and Comparative Examples discussed above, the above-mentioned phenomenon can be considered to be a common to all polysaccharides such as succinoglucan, rhamzan gum and weran gum. The Comparative Examples 1 and 4 containing succinoglucan show more tendency to forming the low viscosity component containing the excess amount of the coloring pigment compared to the other ink containing rhamzan gum or weran gum. On the other hand, though succinoglucan is included, Examples 1, 3, 5 and 7 wherein pigment particles of the coloring pigment form the spotted agglomerate phase or the complex agglomerate phase with the agglomerate phase of the aluminum powder pigment, can restrain the tendency to separate of the low viscosity component containing excess amount of a coloring pigment and ensure the stability against long-term storage.

The particle diameter of the agglomerate phase formed in Examples 1–4 is 0.5 μm to 30 μm as an actual measurement based on the micrograph (X200). And the average particle diameter of the agglomerate phase formed in Examples 1–4 is 5 μm to 14 μm as an actual measurement based on the micrograph (X200).

However, with the ink of Examples 1–4 diluted by 10 times their volume of the ion-exchange water, its average particle diameter is 0.1 μm when measured by photo correlation spectroscopy. From the above-mentioned facts, the agglomerate phase formed by the pigment particles in the Examples 1–4 is not a coagulation of the pigment particles but, an agglomeration wherein the pigment particles are connected by such a weak bond as it can be dissociated by diluting with ion-exchange water. This phenomenon is also common to all the polysaccharides such as succinoglucan, rhamzan gum and weran gum.

Figure 29:
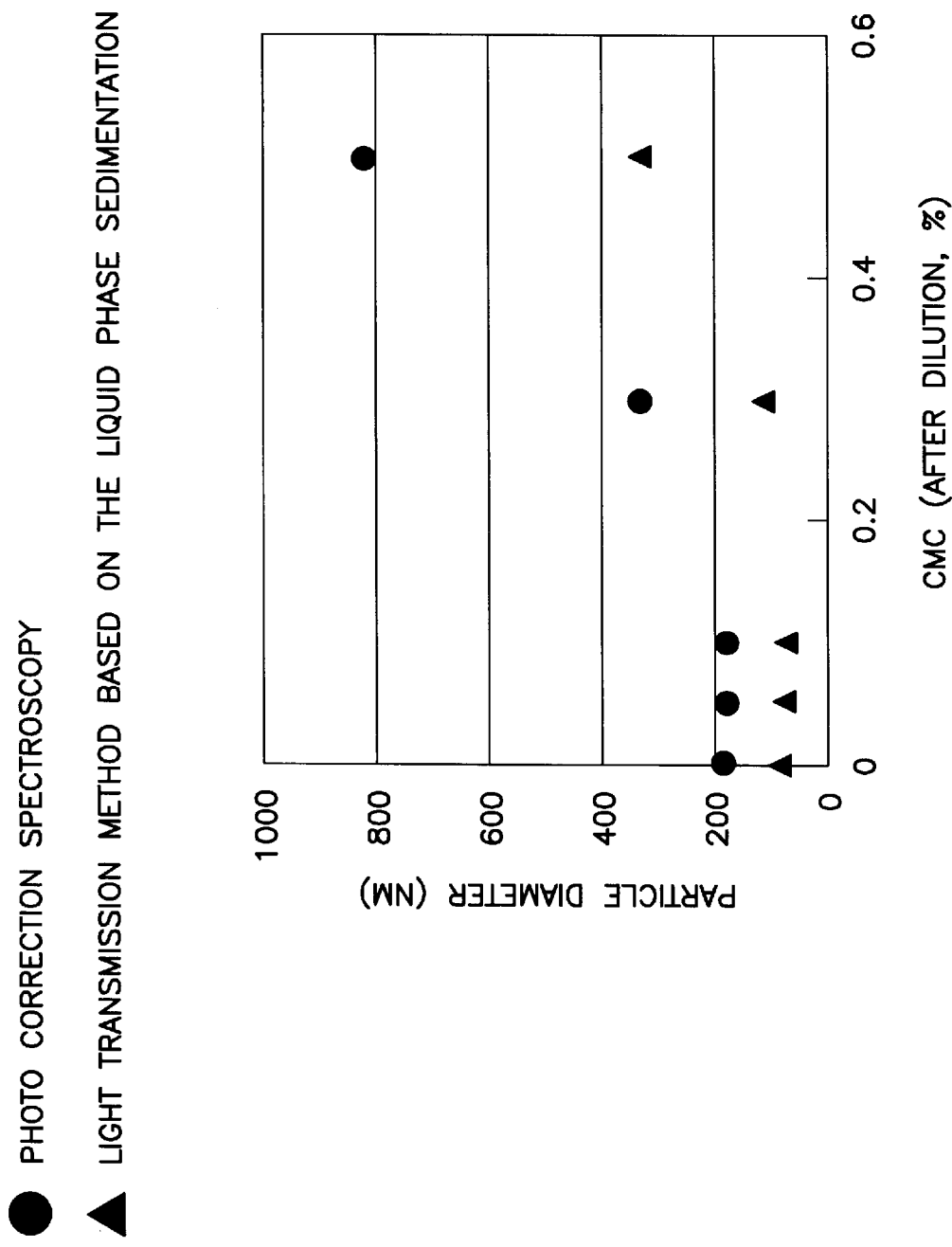
FIG. 29 is a graphical representation of the relationship between the concentration of CMC (%) and particle diameter shown in Table 5.

To prove the mentioned facts more clearly, the inks of Examples 9–12 and Comparative Example 7 are prepared with the components shown in the following Table 5. Each of these inks is diluted by ten times their volume with water and these diluted ink are investigated and their pigment particle diameter are measured by photo correlation spectroscopy utilizing trade name: "LPA3000/31000" available from Otsuka Electronics Co., Ltd. and by light transmission method based on the liquid phase sedimentation utilizing trade name: "CAPA-700", available from Horiba, Ltd. FIG. 29 is a graph representation based on the result of the measurements shown in Table 5 and illustrates the relationship between the concentration of CMC (Carboxy methyl Cellulose) (%) and the pigment particle diameter.

TABLE 5

| | | [% by weight] | | | | |
|---|---|---|---|---|---|---|
| | | Example | | | | Com. Ex. |
| | | 9 | 10 | 11 | 12 | 7 |
| Blue pigment dispersion | | 20 | 20 | 20 | 20 | 20 |
| Carboxymethyl cellulose (10% water solution) | | 50 | 30 | 10 | 5 | — |
| Succinoglucan (1% water solution) | | 20 | 20 | 20 | 20 | 20 |
| Ion-exchange water | | rest | rest | rest | rest | Rest |
| Pigment particle diameter (μm) | Light transmission method based on the liquid phase sedimentation | 0.82 | 0.33 | 0.18 | 0.18 | 0.18 |
| | Photo correlation spectroscopy | 0.33 | 0.11 | 0.07 | 0.07 | 0.08 |

Note) The pigment particle diameter is measured in the dilution of the ink of Examples and Comparative Examples diluted by ten times their volume with water.

As can be understood from the Table 5 and FIG. 29, the pigment particle diameter increases with the concentration of CMC. When Examples 11 and 12, wherein the concentration of CMC is low, are diluted by ten times their volume of ion-exchange water, the particle diameter of the pigment particles becomes quite low and almost the same as that of Comparative Example 7, which does not contain any CMC. From the results stated above, the particle diameter increases with the concentration of CMC. And considered with the mentioned micrograph, it can be understood that the pigment particles gather and agglomerate to form the pigment phase in the ink of each Example.

The inks of Examples 9, 13 and 14 are prepared with the components shown in the following Table 6. Each of the ink is diluted by ten times their volume with ion-exchange water and the particle diameter of the pigment particles in these dilutions is measured by photo correlation spectroscopy.

FIG. 30 is a graph representation based on the result of measurements shown in Table 6 and illustrates the relationship between the concentration of the diluted pigment dispersion(%) and the pigment particle diameter.

TABLE 6

| | | [% by weight] | | |
|---|---|---|---|---|
| | | Example | | |
| | | 9 | 13 | 14 |
| Blue pigment dispersion | | 20 | 10 | 0.4 |
| Carboxymethyl cellulose (10% water solution) | | 50 | 50 | 50 |
| Succinoglucan (1% water solution) | | 20 | 20 | 20 |
| Ion-exchange water | | rest | rest | Rest |
| Pigment particle diameter (μm) | Photo correlation spectroscopy | 0.39 | 0.32 | 0.14 |

Note) The pigment particle diameter is measured in the dilution of the ink prepared in Examples diluted by ten times their volume with water.

As can be understood from Table 6 and FIG. 30, the diameter of the pigment particle increases with the concentration of the pigment in the ink. Considered with the micrograph, the pigment particles of the ink prepared in each Example gather and agglomerate to form the pigment phase.

Table 5 and Table 6 show the change of pigment particle diameter when the CMC is included as a water-soluble polymer. However, it is true of the case the polyethylene glycol is included as a water-soluble polymer. Each component shown in Table 5 and 6 is the same as those used in Example 1.

From the results shown in Table 5 and Table 6, it is suggested that in the ink of the present invention containing a water-soluble organic solvent, water and a polysaccharide, the water-soluble polymer acts as a binding medium on the pigment particles which form the agglomerate phase. The particles do not coagulate firmly however, and form a kind of agglomeration. This agglomeration of the pigment particles forms the pigment phase and therefore, the stability against long-term storage of ink can be obtained. Such an effect can be exhibited regardless of the kind of polysaccharide such as rhamzan gum, weran gum and succinoglucan.

The present invention relates to an ink comprising a coloring pigment, a water-soluble organic solvent, water and a polysaccharide wherein the pigment particles of the coloring pigment gather and form the spotted agglomerate phase. The present ink can prevent the separation of the coloring pigment in the ink and provide the writing portion with uniform color. Moreover, the aqueous ink for ball point pens of the present invention has excellent stability against long-term storage since it prevents ink leakage or excess ink flow out.

Specifically, in case of the aqueous ink comprising a water-soluble organic pigment, water and a polysaccharide wherein pigment particles of both coloring pigment and metallic powder pigment gather in the same pigment phase to form a complex agglomerate phase, the separation of the coloring pigment or the separation between the coloring pigment and the metallic powder pigment can be prevented, the segregation of the writing potion is restrained and the writing portion with uniform metallic color can be obtained, the ink leakage and excess flow out of the ink can be prevented and excellent stability against long-term storage is obtained.

In addition, the pigment particles in an ink including polysaccharide of the present invention are constituted as a number of agglomerated particles from microscopic point of view, but they are constituted as spotted phases consisting essentially of agglomerated pigment particles from macroscopic point of view. On the other hand, the pigment particles in the conventional ink including polysaccharide are constituted as primary particles, not agglomerated particles, and they are constituted as the belt-shaped phase. Accordingly, "spotted agglomerated phases" of the present invention means "spotted phases consisting essentially of agglomerated pigment particles", and "belt shaped phases" of the conventional ink means "belt shaped phases consisting essentially of primary pigment particles".

In addition, the present invention includes the identical subject matter disclosed in the specification, claims and drawings of Japan Patent Application No. 11-315563 , to which is claimed priority for the present application. The specification, claims and the drawings of that application are incorporated herein by reference.

We claim:

1. An aqueous ink for ball point pens comprising a coloring pigment, a water-soluble organic solvent, water and a polysaccharide, wherein pigment particles of said coloring pigment gather and form a dotted agglomerate phase.

2. An aqueous ink for ball point pens comprising a coloring pigment, a metallic powder pigment, water-soluble organic solvent, water and a polysaccharide, wherein pigment particles of both said coloring pigment and said metallic powder pigment gather in same pigment phase and form a dotted complex agglomerate phase.

3. An aqueous ink for ball point pens as set forth in claim 1, wherein the average particle diameter of the agglomerate phase is 5 $\mu$m to 14 $\mu$m as an actual measurement based on the micrograph.

4. An aqueous ink for ball point pens as set forth in claim 2, wherein the average particle diameter of the agglomerate phase is 10 $\mu$m to 13 $\mu$m as an actual measurement based on the micro graph.

5. An aqueous ink for ball point pens as set forth in claim 1, wherein the pigment particles forming the agglomerate phase gather with a water-soluble polymer as a binding medium.

6. An aqueous ink for ball point pens as set forth in claim 2, wherein the pigment particles forming the complex agglomerate phase gather with a water-soluble polymer as a binding medium.

7. An aqueous ink for ball point pens as set forth in claim 1, wherein the polysaccharide is at least one compound selected from the group consisting of rhamzan gum, weran gum, xanthan gum and succinoglucan.

8. An aqueous ink for ball point pens as set forth in claim 2, wherein the polysaccharide is at least one compound selected from the group consisting of rhamzan gum, weran gum, xanthan gum and succinoglucan.

9. An aqueous ink for ball point pens as set f orth in claim 5, wherein the water-soluble polymer is a polyethylene glycol.

10. An aqueous ink for ball point pens as set forth in claim 9, wherein the number average molecular weight of the polyethylene glycol is 8,000 to 1,100,000.

11. An aqueous ink composition for ball point pens as set forth in claim 6, wherein the water-soluble polymer is a polyethylene glycol.

12. An aqueous ink for ball point pens as set forth in claim 11, wherein the number average molecular weight of the polyethylene glycol is 8,000 to 1,100,000.

13. An aqueous ink for ball point pens as set forth in claim 5, wherein the water-soluble polymer is a cellulose derivative.

14. An aqueous ink for ball point pens as set forth in claim 13, wherein the number average molecular weight of the cellulose derivative is 7,000 to 400,000.

15. An aqueous ink for ball point pens as set forth in claim 6, wherein the water-soluble polymer is a cellulose derivative.

16. An aqueous ink for ball point pens as set forth in claim 15, wherein the number average molecular weight of the cellulose derivative is 7,000 to 400,000.

17. An aqueous ink for ball point pens as set forth in claim 5, wherein the content of the water-soluble polymer is 0.1% by weight to 10% by weight relative to the total amount of the ink composition.

18. An aqueous ink for ball point pens as set forth in claim 6, wherein the content of the water-soluble polymer is 0.1% by weight to 10% by weight relative to the total amount of the ink composition.

* * * * *